United States Patent [19]

Ishizu

[11] Patent Number: 5,757,862
[45] Date of Patent: May 26, 1998

[54] DEMODULATOR, MODULATION AND DEMODULATION SYSTEM, AND DEMODULATION METHOD

[75] Inventor: Fumio Ishizu, Tokyo, Japan

[73] Assignee: Mitsubishi Denki Kabushiki Kaisha, Tokyo, Japan

[21] Appl. No.: 687,638

[22] Filed: Jul. 26, 1996

[30] Foreign Application Priority Data

Sep. 18, 1995 [JP] Japan ................. 7-238145

[51] Int. Cl.[6] .............. H04L 27/14; H04L 27/16; H04L 27/22

[52] U.S. Cl. ............. 375/324; 375/325; 375/200; 329/304; 329/309

[58] Field of Search ................. 375/200, 206, 375/324, 325; 329/304, 309

[56] References Cited

U.S. PATENT DOCUMENTS

| | | | |
|---|---|---|---|
| 4,317,210 | 2/1982 | Dekker et al. | 375/76 |
| 4,362,997 | 12/1982 | Van Driest | 329/50 |
| 4,388,595 | 6/1983 | Brooks | 329/104 |
| 4,543,531 | 9/1985 | Sugita et al. | 329/50 |
| 4,592,074 | 5/1986 | Whikehart | |
| 4,707,666 | 11/1987 | Pfeifer et al. | 329/110 |
| 4,896,336 | 1/1990 | Henely et al. | 375/80 |
| 5,260,975 | 11/1993 | Saito | 375/81 |
| 5,333,150 | 7/1994 | Ketterling | 375/80 |
| 5,414,728 | 5/1995 | Zehavi | 375/200 |
| 5,440,265 | 8/1995 | Cochran et al. | 329/300 |
| 5,475,710 | 12/1995 | Ishizu et al. | 375/232 |
| 5,588,027 | 12/1996 | Lim | 375/330 |
| 5,691,974 | 11/1997 | Zehavi et al. | 370/203 |

*Primary Examiner*—Stephen Chin
*Assistant Examiner*—Muhammad Ghayour
*Attorney, Agent, or Firm*—Wolf, Greenfield & Sacks, P.C.

[57] ABSTRACT

A demodulator of the present invention comprises a clock signal generator for generating a clock signal having a frequency that is 4 times n times (n is an integer greater than zero) the carrier frequency of a received signal, an analog-to-digital (A/D) converter for converting the received signal into a digital signal, a complex signal generator clocked by the clock signal to generate a complex signal comprised of the received signal as a real part and a π/2 phase-shifted signal as an imaginary part, a phase rotator for generating quasi-coherent detected signals by multiplying the complex signal by specific values of the carrier frequency, and a decimation circuit clocked by a clock signal to generate the required I channel signal and Q channel signal by decimating the quasi-coherent detected signals so as to finally obtain improved accuracy for accomplishing quadrature detection and eliminate an amplitude deviation and a direct-current offset.

15 Claims, 16 Drawing Sheets

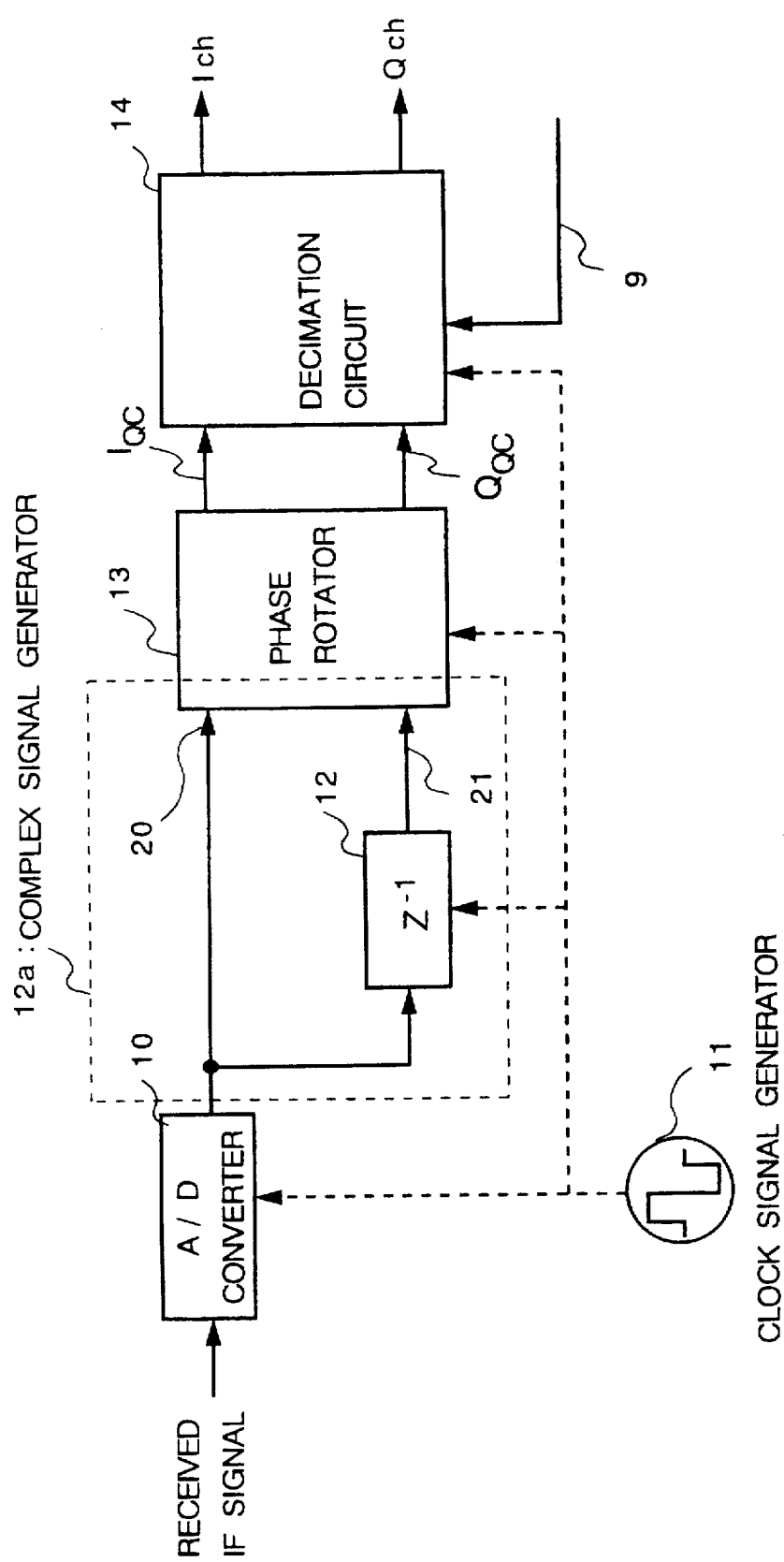

INPUT AND OUTPUT CHARACTERISTICS OF SELECTOR

| OUTPUT OF MODULO 4 COUNTER | $I_C$ OUTPUT | $Q_C$ OUTPUT |
|---|---|---|
| 00 | R(t) | D(t) |
| 01 | −D(t) | R(t) |
| 10 | −R(t) | −D(t) |
| 11 | D(t) | −R(t) |

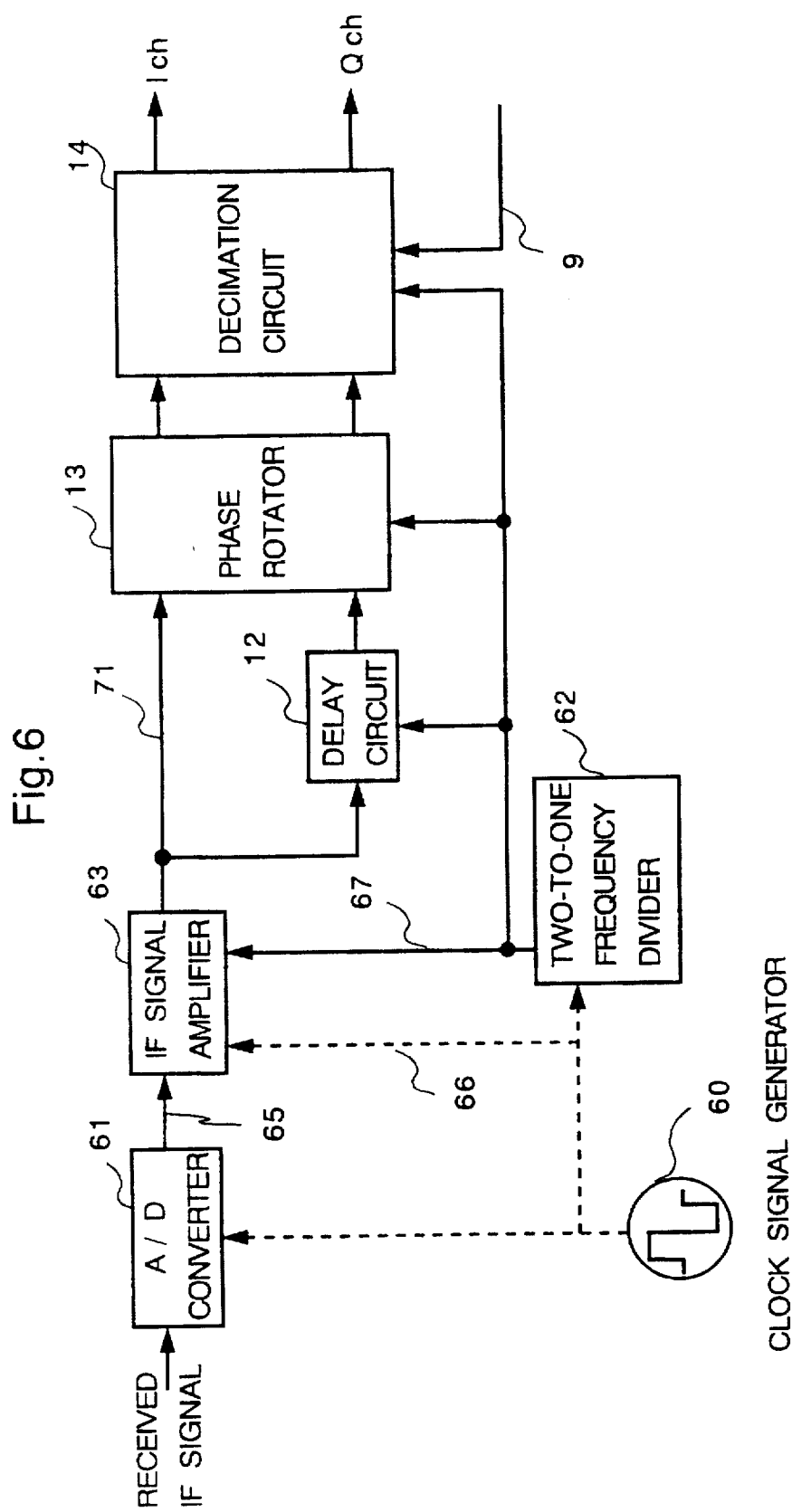

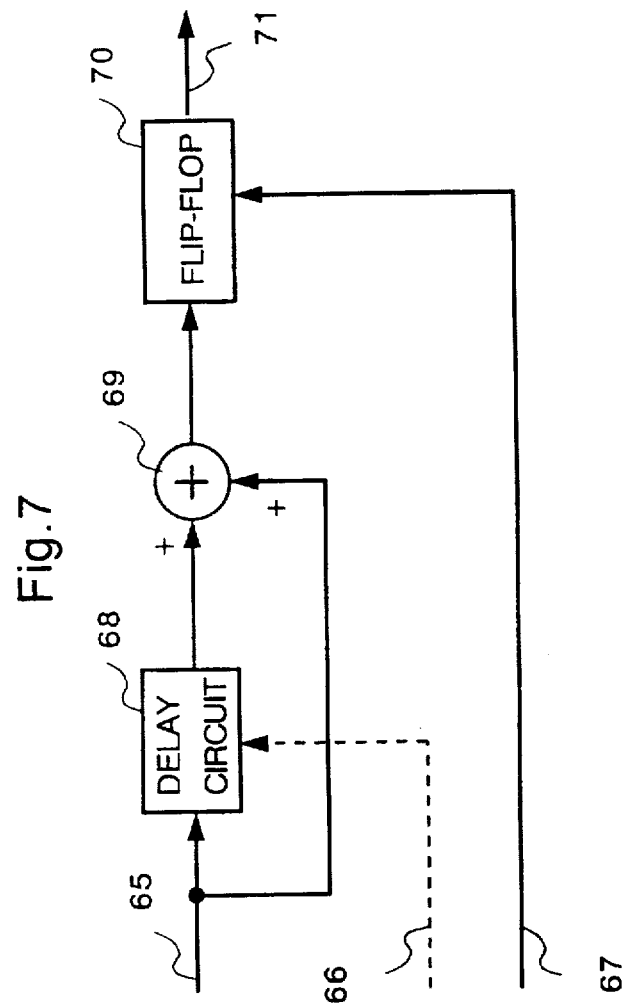

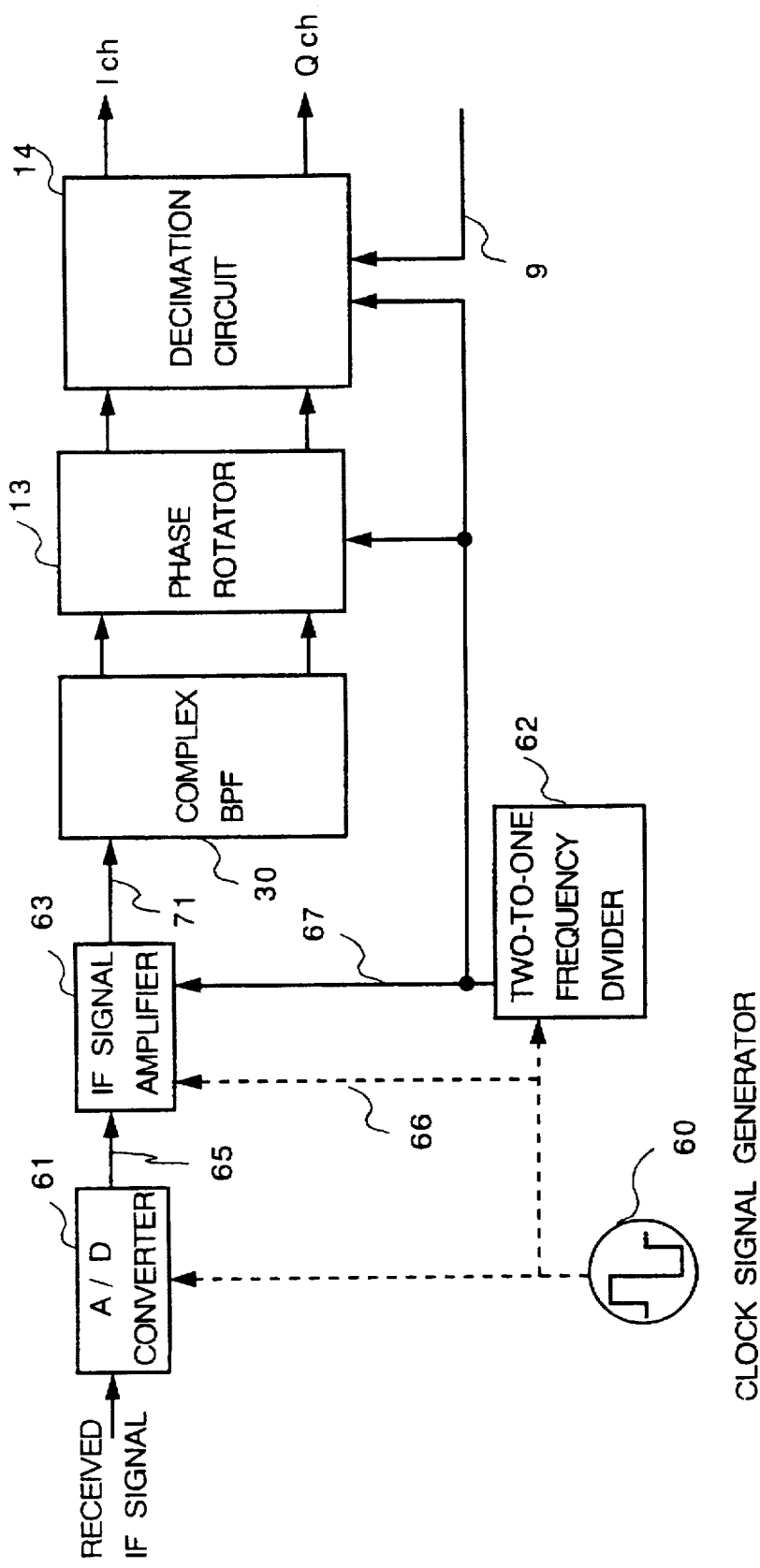

DEMODULATOR, MODULATION AND DEMODULATION SYSTEM, AND DEMODULATION METHOD

BACKGROUND OF THE INVENTION

1. Field of the Invention

The present invention relates to a demodulator for recovering a required signal by accomplishing quadrature detection of a received signal carried on a high-frequency carrier wave.

2. Discussion of the Related Art

FIG. 17 illustrates a conventional quasi-coherent quadrature detector which is described in the technical report of CS87-109 of the Institute of Electronics, Information and Communication Engineers of Japan, entitled "A study of the demodulation mathematics for a signal which has been subject to phase-shift keying".

In FIG. 17, the conventional quasi-coherent quadrature detector is comprised of a first mixer 1 for mixing a received IF signal with the output signal of a fixed oscillator 3, a second mixer 2 for mixing the received IF signal with a $\pi/2$ phase-led signal from the phase of the output signal of the fixed oscillator 3, the fixed oscillator 3 whose output frequency is approximately equivalent to the center frequency of the received IF signal, a phase shifter 4 for shifting the phase of the output signal of the fixed oscillator 3 by $\pi/2$ ahead, a first low-pass filter 5 (hereinafter referred to as LPF) for eliminating harmonic components of the output of the first mixer 1, a second LPF 6 for eliminating harmonic components of the output of the second mixer 2, a first analog to digital (hereinafter referred to as A/D) converter 7 for performing A/D conversion of the output of the first LPF 5, a second A/D converter 8 for performing A/D conversion of the output of the second LPF 6, input terminals 9 for a clock signal for clocking the first A/D converter 7 and the second A/D converter 8.

Now, the operation of the conventional quasi-coherent quadrature detector illustrated in FIG. 17 will be described. It is assumed herein that a received IF signal is phase-modulated and is calculated by the following equation:

$$R(t) = Re[(I(t) + jQ(t))\exp\{j(\omega_c t + \theta_c)\}] \quad (1)$$
$$= I(t)\cos(\omega_c t + \theta_c) - Q(t)\sin(\omega_c t + \theta_c)$$
$$= A(t)\cos\{\omega_c t + \theta_c + \theta_m(t)\}$$

where $$I(t) = A(t)\cos\{\theta_m(t)\} \quad (2)$$
$$Q(t) = A(t)\sin\{\theta_m(t)\}$$

where I(t) represents an in-phase baseband component, Q(t) represents a quadrature-phase baseband component, $\omega_c$ represents a carrier angular frequency, $\theta_C$ (t) represents a carrier phase, A(t) represents a carrier amplitude component, and $\theta_L$ (t) represents a modulated phase component.

For the simplified description, it is also assumed herein that the frequency of the output of the fixed oscillator 3 is equal to the frequency $\omega_c$ of the received IF signal.

$$L_o(t) = 2\cos(\omega_c t + \theta_{Lo}) \quad (3)$$

$$L_p(t) = -2\sin(\omega_c t + \theta_{Lo}) \quad (4)$$

where $L_o$ (t) represents the output signal of the fixed oscillator 3, $L_p$ (t) represents the output signal of the phase shifter 4. $\theta_{Lo}$ represents the initial phase of the output signal of the fixed oscillator 3. In this situation, an output signal $M_1$ (t) of the first mixer 1 is represented by the following Equation (5) and an output signal $M_2$ (t) of the second mixer 2 is represented by the following Equation (6):

$$M_1(t) = R(t) \times L_o(t) \quad (5)$$
$$= A(t)[\cos\{(\theta_c - \theta_{Lo}) + \theta_m(t)\} +$$
$$\cos\{2\omega_c + (\theta_c + \theta_{Lo}) + \theta_m(t)\}]$$
$$= A(t)[\cos\{\Delta\theta_N + \theta_m(t)\} + \cos\{2\omega_c + \Delta\theta_P + \theta_m(t)\}]$$

$$M_2(t) = R(t) \times L_p(t) \quad (6)$$
$$= A(t)[\sin\{(\theta_c - \theta_{Lo}) + \theta_m(t)\} -$$
$$\sin\{2\omega_c + (\theta_c + \theta_{Lo}) + \theta_m(t)\}]$$
$$= A(t)[\sin\{\Delta\theta_N + \theta_m(t)\} - \sin\{2\omega_c + \Delta\theta_P + \theta_m(t)\}]$$

where $\Delta\theta_N$ represents $\theta_c - \theta_{Lo}$, $\Delta\theta_P$ represents $\theta_c + \theta_{Lo}$.

The output signal $M_1$ (t) of the first mixer 1 and the output signal $M_2$ (t) of the second mixer 2 are input into the first LPF and the second LPF respectively for the elimination of harmonic components, and quasi-coherent detected signals $I_{QC}$ (t) and $Q_{QC}$ (t) are obtained.

$$I_{QC}(t) = A(t)\cos\{\Delta\theta_N + \theta_m(t)\} \quad (7)$$
$$Q_{QC}(t) = A(t)\sin\{\Delta\theta_N + \theta_m(t)\}$$

When the quasi-coherent detected signals in Equation (7) are expressed in terms of complex numbers, the following Equation (8) is obtained:

$$R_{QC}(t) = A(t)\exp\{j(\Delta\theta_N + \theta_m(t))\} \quad (8)$$
$$= A(t)\exp\{j\theta_m(t)\}\exp(j\Delta\theta_N)$$
$$= A(t)\{\cos\theta_m(t) + j\sin\theta_m(t)\}\exp(j\Delta\theta_N)$$
$$= \{I(t) + jQ(t)\}\exp(j\Delta\theta_N)$$

As a result of quasi-coherent detection, it is found that the quasi-coherent detected output can be obtained by phase-rotating a transmitted baseband signal by $\Delta\theta_N$, which is a phase difference between the received IF signal and the output signal of the fixed oscillator 3.

Then, the quasi-coherent detected signal $I_{QC}$ (t) of the first LPF and the quasi-coherent detected signal $Q_{QC}$ (t) of the second LPF are converted into digital signals through the first A/D converter 7 and the second A/D converter 8 respectively.

The quasi-coherent detected signals which have been converted by the A/D converters undergo demodulation such as coherent detection and differential detection at the subsequent steps of operation. When the frequency of the received IF signal and the frequency of the output signal of the fixed oscillator 3 are different, the phase-rotated $\Delta\theta_N$ should only be changed to $(\omega_c - \omega_{Lo}) t + \Delta\theta_N$, and the similar signal processing to that described above is applicable. The operation principles of the conventional quasi-coherent quadrature detector are as described above.

The conventional quasi-coherent detector portion of the demodulator for accomplishing quadrature detection prior to A/D conversion is comprised of analog circuits as described above. Consequently, the conventional quasi-coherent detector has the following disadvantages:

1) An amplitude deviation occurs between $I_{QC}$ (t) and $Q_{QC}$ (t).
2) A direct-current offset occurs in the A/D converters.
3) Accuracy for accomplishing quadrature detection is insufficiently provided.

SUMMARY OF THE INVENTION

The present invention is made to solve the above-described problems. It is therefore an object of the present invention to provide a demodulator having a quadrature detector with improved accuracy for accomplishing quadrature detection, being free from an amplitude deviation and a direct-current offset by means of the simplified circuit configuration and the simplified signal processing.

A demodulator according to one aspect of the present invention demodulates a received signal having a carrier frequency and generates an I channel signal and a Q channel signal. The demodulator comprises a clock signal generator for generating a clock signal having a frequency, an analog to digital converter having a sample rate which is controlled by the frequency of the clock signal for converting the received signal to a digital received signal, and a complex signal generator that receives the clock signal, the digital received signal, and a π/2 phase-shifted signal generated by delaying the phase of the digital received signal by π/2, and generates a complex signal. The demodulator also includes a phase rotator for generating quasi-coherent detected signals by multiplying the complex signal by specific values of the carrier frequency and a decimation circuit for generating the I channel signal and the Q channel signal by decimating the quasi-coherent detected signals.

A demodulator according to another aspect of the present invention may comprise a complex band pass filter which functions as the complex signal generator and includes plural cascaded delay circuits. The complex band pass filter is controlled by the clock signal, delays the digital received signal, and combines outputs of the delay circuits and the digital received signal.

A demodulator according to yet another aspect of the present invention may further comprise a delta-modulator having a sample-and-hold circuit, a closed loop including a one-bit digital to analog converter, and an adder, controlled by the clock signal.

BRIEF DESCRIPTION OF THE DRAWINGS

FIG. 1 is a block diagram showing a configuration of a demodulator according to the first embodiment of the present invention;

FIG. 6 is a block diagram showing a configuration of a demodulator according to the fourth embodiment of the present invention;

FIG. 7 is a block diagram showing a configuration of the IF signal amplifier illustrated in FIG. 6;

FIG. 8 is a block diagram showing a configuration of a demodulator according to the fifth embodiment of the present invention;

DESCRIPTION OF PREFERRED EMBODIMENTS

Embodiment 1

Figures 2A, 2B:
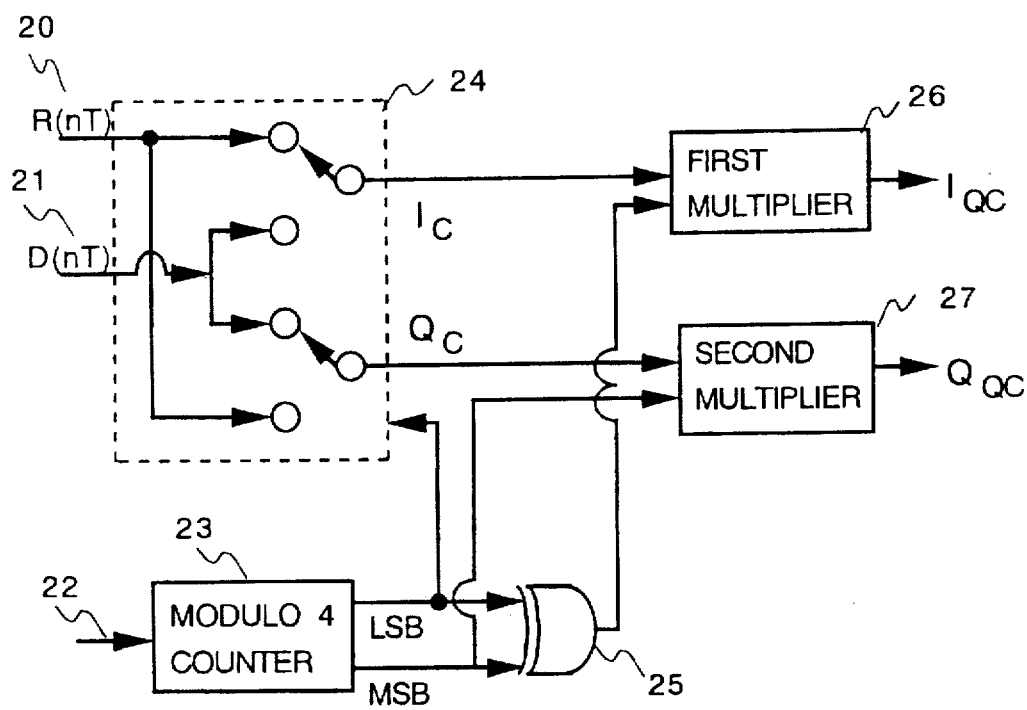
FIG. 2(a) is a block diagram showing a configuration of the phase rotator illustrated in FIG. 1.
FIG. 2(b) is a table showing the input and output characteristics of the selector in the phase rotator.

The conventional quasi-coherent quadrature detector portion prior to A/D conversion is comprised of analog circuits. Consequently, an amplitude deviation occurs between $I_{QC}(t)$ and $Q_{QC}(t)$, a direct-current offset occurs in the A/D converters, and accuracy for accomplishing quadrature detection is insufficiently provided. This embodiment aims to solve the aforementioned problems of the amplitude deviation and the insufficient accuracy for accomplishing quadrature detection by directly converting a received IF signal by means of an A/D converter and accomplishing quadrature detection through the subsequent digital signal processing.

FIG. 1 is a block diagram showing a configuration of the quadrature detector of a demodulator according to this embodiment of the present invention. In the drawing, like elements and signals are referenced by like numerals throughout.

In FIG. 1, an A/D converter 10 operates at a high frequency and directly converts a received analog IF signal into a digital signal. A fixed clock signal generator 11 generates a clock signal having approximately four times the frequency of the received IF signal and actuating the A/D converter 10 and the subsequent digital circuits. A delay circuit 12 delays the output of the A/D converter 10 by one clock time. A phase rotator 13 performs complex multiplication of the output signal of the A/D converter 10 and the output signal of the delay circuit 12 by specific values of the IF frequency to eliminate a phase-rotated component, and outputs quasi-coherent detected signals. A decimation circuit 14 receives the quasi-coherent detected signals which have been output from the phase-rotator 13 at the frequency of the clock signal of the clock signal generator 11, and decimates the quasi-coherent detected signals to output the required quasi-coherent detected signals for the subsequent step of operation in a following circuit.

FIG. 2 is a block diagram showing a configuration of the phase rotator 13 illustrated in FIG. 1.

In FIG. 2, the phase rotator 13 is comprised of an input terminal 20 for the output signal of the A/D converter 10, an input terminal 21 for the output signal of the delay circuit 12, an input terminal 22 for a clock signal which has been output from the clock signal generator 11, a modulo 4 counter 23 which is actuated by the clock signal input into the input terminal 22, and outputs a sequence of (0,1,2,3) outputs repeatedly, a selector 24 for determining the combination of the input signals input into the input terminals 20 and 21, based on the LSB output of the modulo 4 counter 23 and for outputting the determined two output signals. The phase-rotator 13 is further comprised of an exclusive OR circuit 25 for the two outputs from the modulo 4 counter 23, a first multiplier 26 for multiplying one of the two outputs from the selector 24 by the output of the exclusive OR circuit 25 to output a quasi-coherent detected in-phase signal $I_{QC}$, a second multiplier 27 for multiplying the other one of the two output signals of the selector 24 by the MSB output signal of the modulo 4 counter 23 to output a quasi-coherent detected quadrature-phase signal $Q_{QC}$.

In the circuit configuration according to this embodiment of the present invention, the complex signal generator for generating the complex signals $I_C$, $Q_C$ and the phase rotator for obtaining the quasi-coherent detected in-phase signal $I_{QC}$ and the quadrature-phase signal $Q_{QC}$ are partially combined.

Next, the operation of this embodiment is described.

Now, it is assumed herein that a received signal is given by Equation (1).

Clocked by a clock signal T which has been output from the clock signal generator 11, the A/D converter 10 converts the received signal into a digital signal. As described hereinbefore, the frequency of the clock signal T is set to approximately four times the frequency of the received IF signal. Now, for the simplified description, let us assume again the clock signal T has exactly four times the frequency of the received IF signal. Then, the output of the A/D converter 10 is represented by the following equation:

$$R(nT) = A(nT)\cos\{\omega_c nT + \theta_c + \theta_m(nT)\} \quad (9)$$
$$= A(nT)\cos\{2\pi f_c n/4f_c + \theta_c + \theta_m(nT)\}$$
$$= A(nT)\cos\{\pi n/2 + \theta_c + \theta_m(nT)\}$$

where, $f_c$ represents the frequency of the received IF signal, T represents the period of the clock signal for accomplishing A/D conversion and is calculated by the equation $T=1/(4f_c)$, and n represents an integer greater than zero.

The output signal of the A/D converter 10 is divided into two branched signals, and one of the two branched signals is input into the delay circuit 12. Then, the output of the delay circuit 12 is given by the following equation:

$$D(nT)=A((n-1)T)\cos\{\pi(n-1)/2+\theta_c+\theta_m((n-1)T)\} \quad (10)$$

Now, assuming that the frequency of the received IF signal is sufficiently high, compared with the symbol rate (this assumption is generally holds true), the symbol rate, noise components within a predetermined band having frequencies corresponding to the symbol rate, and components which fluctuate in a rate including the phasing rate being equal to or smaller than the symbol rate can be neglected and the following approximate equations can be obtained:

$$\left.\begin{array}{l}A((n-1)T) \approx A(nT) \\ \theta_m((n-1)T) \approx \theta_m(nT)\end{array}\right\} \quad (11)$$

Consequently, the output signal of the delay circuit 12 approximates as shown by the following Equation (12):

$$D(nT) = A(nT)\cos\{\pi(n-1)/2 + \theta_c + \theta_m(nT)\} \quad (12)$$
$$= A(nT)\cos\{\pi n/2 + \theta_c + \theta_m(nT) - \pi/2\}$$
$$= A(nT)\sin\{\pi n/2 + \theta_c + \theta_m(nT)\}$$

Consequently, it is found that an output signal $D(nT)$ of the delay circuit 12 approximates a signal whose phase is $\pi/2$-delayed from that of the output signal $R(nT)$ of the A/D converter 10 and whose waveform is a sine wave.

When expressing the received signal in terms of complex numbers with the output signal $R(nT)$ of the A/D converter 10 as the real part and the output signal $D(nT)$ of the delay circuit 12 as the imaginary part, the received signal is expressed to be a complex signal $S(nT)$, phase-rotated (multiplied) by specific values of the frequency of the IF frequency $f_c$ as follows:

$$S(nT) = R(nT) + jD(nT) \quad (13)$$
$$= A(nT)\cos\{\pi n/2 + \theta_c + \theta_m(nT)\} +$$
$$jA(nT)\sin\{\pi n/2 + \theta_c + \theta_m(nT)\}$$
$$= A(nT)\exp[j\{\pi n/2 + \theta_c + \theta_m(nT)\}]$$

Consequently, an quasi-coherent detected output can be obtained by phase-counterrotating (multiplying) the output of the complex signal generator for generating a complex signal represented by Equation (13), by specific values of the IF frequency at the subsequent step of operation.

Thus, the complex received IF signal $S(nT)$ represented by the Equation (13) is input into the phase rotator 13. In the phase rotator 13, by using complex multiplication, the complex signal $S(nT)$ is phase-counterrotated (multiplied) by specific values of the IF frequency .

When the frequency of the received IF signal is set to $f_c$, the complex phase-counterrotating signal $C(nT)$ is given by the following Equation (14), since the received IF signal is sampled at four times the frequency of the IF frequency at the time of A/D conversion.

$$C(nT) = \exp\{-j(2\pi f_c nT/4f_c)\} \quad (14)$$
$$= \exp\{-j(n\pi/2)\}$$

In this case, n is set to be an integer below 4, being any of a sequence of the integers 0, 1, 2, 3. A quasi-coherent detected output can be obtained by the complex multiplication of $S(nT)$ by $C(nT)$.

$$BB(nt) = S(nt) \times C(nT) \quad (15)$$
$$= A(nT)\exp[j\{\pi n/2 + \theta_c + \theta_m(nT)\}] \times$$
$$\exp\{-j(n\pi/2)\}$$
$$= A(nT)\exp[j\{\theta_c + \theta_m(nT)\}]$$
$$= A(nT)\cos\{\theta_c + \theta_m(nT)\} +$$
$$jA(nT)\sin\{\theta_c + \theta_m(nT)\}$$
$$= \{I(nt) + jQ(nT)\}\exp(j\theta_c)$$
$$= I_{QC}(nT) + jQ_{QC}(nT)$$

As seen from the above Equation (14), the value of the C(nT) is determined to be any of 1, −J, −1, J. As described above, since n is any of a sequence of the integers 0, 1, 2, 3, the modulo 4 counter is set to output a sequence of the integers 0, 1, 2, 3 repeatedly.

$$C(nT) = \begin{Bmatrix} 1 & \dots & mod(n/4) & = & 0 \\ -j & \dots & mod(n/4) & = & 1 \\ -1 & \dots & mod(n/4) & = & 2 \\ j & \dots & mod(n/4) & = & 3 \end{Bmatrix} \quad (16)$$

Consequently, the output of the phase rotator 13 is also given by any one of the four equations of Equation (17).

$$BB(nT) = \begin{Bmatrix} R(nT) + jD(nT) & \dots & mod(n/4) & = & 0 \\ -D(nT) + jR(nT) & \dots & mod(n/4) & = & 1 \\ -R(nT) - jD(nT) & \dots & mod(n/4) & = & 2 \\ D(nT) - jR(nT) & \dots & mod(n/4) & = & 3 \end{Bmatrix} \quad (17)$$

Thus, a quasi-coherent detected output BB(nT) can be calculated by Equation (17) instead of Equation (15).

Next, referring to Equation (17) and FIG. 2, the operation of the phase rotator 13 is described.

A clock signal which has been output from the clock signal generator 11 is input into the modulo 4 counter 23 through the input terminal 22. The modulo 4 counter 23 outputs any of a sequence of the integers 0, 1, 2, 3 for every clock. When 0, 1, 2, 3 are expressed in binary notation, they are 00, 01, 10, 11 respectively. Since the frequency of the clock signal from the clock signal generator 11 is set to be four times the frequency of the received IF signal, the period of the modulo 4 counter 23 becomes equal to the period of the received IF signal.

The output signal R(nT) of the A/D converter 10 and the output signal D(nT) of the delay circuit 12 are input into the selector 24. The selector 24 outputs two kinds of signals, $I_C(nT)$ and $Q_C(nT)$, according to the rule based on the LSB output from the modulo 4 counter as shown in FIG. 2(b).

The exclusive OR circuit 25 implements an exclusive OR operation for the LSB output and the MSB output of the modulo 4 counter 23. When the two outputs are equal in value, the exclusive OR circuit 25 outputs "0". When the two outputs are different in value, the exclusive OR circuit 25 outputs "1". The output signal $I_C(nT)$, which is one of the two output signals from the selector 24, and the output from the exclusive OR circuit 25 are input into the first multiplier 26. When the output from the exclusive OR circuit 25 is "0", the first multiplier 26 outputs the output signal $I_C(nT)$ in its original polarity. When the output from the exclusive OR circuit 25 is "1", the first multiplier 26 inverts the polarity of the input and outputs the quasi-coherent in-phase signal $I_{QC}(nT)$.

$Q_C(nT)$, the other one of the two output signals from the selector 24 and the MSB output from the modulo 4 counter 23 are input into the second multiplier 27. When the MSB output is "0", the second multiplier 27 outputs the $Q_C(nT)$ in its original polarity. When the MSB output is "1", the second multiplier 27 outputs the $Q_C(nT)$ which is inverted in its polarity as the quasi-coherent quadrature-phase signal $Q_{QC}(nT)$.

Consequently, the quasi-coherent detected in-phase signal $I_{QC}(nT)$ and the quasi-coherent detected quadrature-phase signal $Q_{QC}(nT)$ from the phase rotator 13 can be represented by one of the four equations of Equation (17).

Since the output signals $I_{QC}(nT)$ and $Q_{QC}(nT)$ from the phase rotator 13 are output at four times the frequency of the received IF signal, they cannot be used for baseband demodulation at the subsequent step of operation. Thus, after the output signals $I_{QC}(nT)$ and $Q_{QC}(nT)$ are input into the decimation circuit 14, they are clocked by a low-frequency clock signal (normally about one-fourth of the symbol frequency) input into the input terminal 9, decimated, and transmitted to the baseband demodulator.

As described hereinbefore, in this embodiment, the received IF signal is sampled directly through one A/D converter, and quadrature detection is accomplished by means of digital signal processing. Consequently, the accuracy for accomplishing orthogonal detection is high and the amplitude of the quasi-coherent detected in-phase signal $I_{QC}(nT)$ and the amplitude of the quasi-coherent detected quadrature-phase signal $Q_{QC}(nT)$ can easily become identical.

The complex signal generator for obtaining the output represented by Equation (13) is used so as to finally obtain the quasi-coherent detected output represented by Equation (15). The quasi-coherent detected output can be further represented by any of the four brief equations of Equation (17). Consequently, by means of the combination of the complex signal generator and the phase rotator, other circuit configurations may be conceived so as to obtain the same output. For example, in accordance with the theory, polarity determination of R(nT) and D(nT) may be carried out first, and $I_{QC}$ and $Q_{QC}$ may be selected by the selector 24, according to Equation (17).

Furthermore, the receiving side can configure the demodulation system for signal reception by means of the demodulator according to the present invention, while the transmitting side can include a modulation system by means of an ordinary modulator.

In this embodiment, a hardware configuration of the demodulator according to the present invention is described. As another aspect of invention, the demodulation method according to the present invention may comprise the steps of delaying the received signal having the carrier frequency by one clock time after A/D conversion by means of a logical operation, combining the A/D output with the output which has been delayed by one clock time so as to obtain the complex signal represented by Equation (13), and obtaining the quasi-coherent detected output represented by Equation (17) by means of the complex multiplication of the above-mentioned complex signal by the signal given by Equation (16).

Embodiment 2

In this embodiment, a circuit configuration will be described which outputs an appropriate quasi-coherent detected output even if a direct-current offset is present in the output of the A/D converter, and which reduces quantization noises occurred at the time of A/D conversion.

FIG. 3 is a block diagram showing a configuration of the quadrature detector of a demodulator according to this embodiment of the present invention.

Figure 3A:
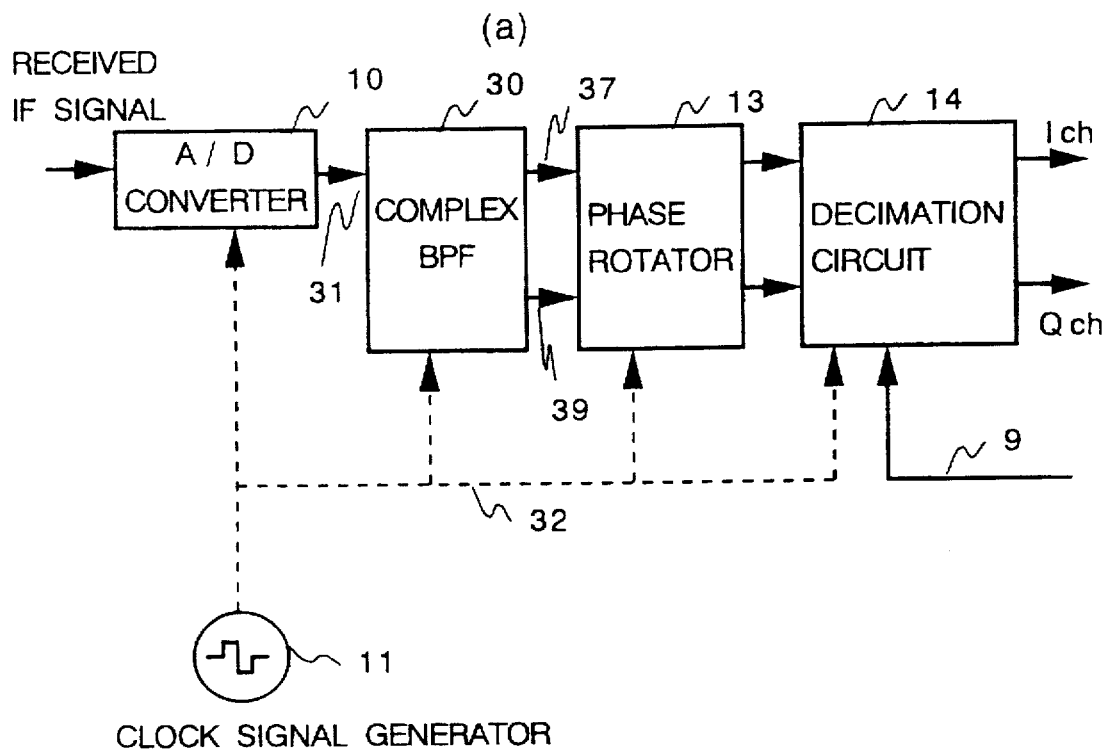
FIG. 3(a) is a block diagram showing a configuration of a demodulator according to the second embodiment of the present invention.

In FIG. 3(a), a complex band pass filter 30 (hereinafter referred to as the complex BPF) eliminates the direct-current offset component of the received IF signal which has been output from the A/D converter 10 and outputs the two, orthogonal signals.

Figure 3B:
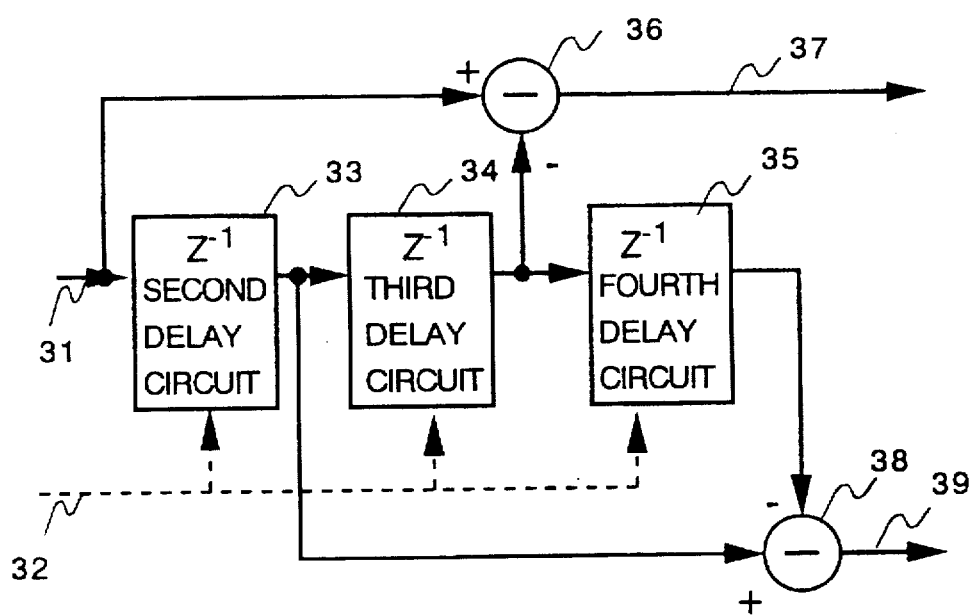
FIG. 3(b) is a block diagram showing a configuration of the complex BPF illustrated in FIG. 3(a)

FIG. 3(b) shows a configuration of the complex BPF.

In FIG. 3(b), the complex BPF is comprised of an input terminal 31 for the output signal of the A/D converter 10, an input terminal 32 for a clock signal which has been output from the clock signal generator 11, a second delay circuit 33 which is clocked by the clock signal input into the input terminal 32 to delay the output signal of the A/D converter 10 input into the input terminal 31 by one clock time, a third delay circuit 34 for further delaying the output of the second delay circuit 33 by one clock time, a fourth delay circuit 35 for further delaying the output of the third delay circuit 34 by one clock time. The complex BPF is further comprised of a first subtracter 36 for subtracting the output signal of the third delay circuit 34 from the output signal of the A/D converter 10 input into the input terminal 31, an output terminal 37 for outputting the output of the subtracter 36 to the phase rotator 13, a second subtracter 38 for subtracting the output of the fourth delay circuit 35 from the output of the second delay circuit 33, and an output terminal 39 for outputting the output of the second subtracter 38 to the phase rotator 13.

Next, the operation of the quadrature detector illustrated in FIG. 3 is described.

Now, it is assumed that the output signal of the A/D converter 10 is represented by Equation (18) as follows:

$$R_D(nT) = A(nT)\cos\{\omega_c nT + \theta_c + \theta_m(nT)\} + A_{DC}(nT) \quad (18)$$
$$= A(nT)\cos\{2\pi f_c n/4f_c + \theta_c + \theta_m(nT)\} + A_{DC}(nT)$$
$$= A(nT)\cos\{\pi n/2 + \theta_c + \theta_m(nT)\} + A_{DC}(nT)$$

In the above Equation (18), $A_{DC}(nT)$ is a direct-current offset component which is contained in the output signal of the A/D converter 10. Excepting $A_{DC}(nT)$, Equation (18) is the same as Equation (9).

A received IF signal is input into the complex BPF 30 through the input terminal 31 and delayed by one clock time each through the second delay circuit 33, the third delay circuit 34, and the fourth delay circuit 35 respectively. When the output signals of the second delay circuit 33, the third delay circuit 34, and the fourth delay circuit 35 are designated $R_2(nT)$, $R_3(nT)$, $R_4(nT)$ respectively, they are represented by the following equations of Equation (19):

$$R_2(nT)=A((n-1)T)\cos\{(n-1)\pi/2+\theta_c+\theta_m((n-1)T)\}+A_{DC}((n-1)T)$$
$$R_3(nT)=A((n-2)T)\cos\{(n-2)\pi/2+\theta_c+\theta_m((n-2)T)\}+A_{DC}((n-2)T)$$
$$R_4(nT)=A((n-3)T)\cos\{(n-3)\pi/2+\theta_c+\theta_m((n-3)T)\}+A_{DC}((n-3)T) \quad (19)$$

Now, assuming that the frequency of the received IF signal is sufficiently high, compared with the symbol rate, the following approximate equations can be obtained, as in the first embodiment:

$$\left.\begin{array}{l} A(nT) \approx A((n-1)T) \approx A((n-2)T) \approx A((n-3)T) \\ \theta_m(nT) \approx \theta_m((n-1)T) \approx \theta_m((n-2)T) \approx \theta_m((n-3)T) \\ A_{DC}(nT) \approx A_{DC}((n-1)T) \approx A_{DC}((n-2)T) \approx A_{DC}((n-3)T) \end{array}\right\} \quad (20)$$

Consequently, $R_2(nT)$, $R_3(nT)$, and $R_4(nT)$ can be represented by the following approximate equations of Equation (21):

$$\begin{array}{rl} R_2(nT) & = A(nT)\cos\{(n-1)\pi/2 + \theta_c + \theta_m(nT)\} + A_{DC}(nT) \\ & = A(nT)\sin\{n\pi/2 + \theta_c + \theta_m(nT)\} + A_{DC}(nT) \\ R_3(nT) & = A(nT)\cos\{(n-2)\pi/2 + \theta_c + \theta_m(nT)\} + A_{DC}(nT) \\ & = -A(nT)\cos\{n\pi/2 + \theta_c + \theta_m(nT)\} + A_{DC}(nT) \\ R_4(nT) & = A(nT)\cos\{(n-3)\pi/2 + \theta_c + \theta_m(nT)\} + A_{DC}(nT) \\ & = -A(nT)\sin\{n\pi/2 + \theta_c + \theta_m(nT)\} + A_{DC}(nT) \end{array} \quad (21)$$

The first subtracter 36 subtracts the output signal $R_3(nT)$ of the third delay circuit 34 from an input signal $R_D(nT)$ input into the input terminal 31 and outputs an output signal $B_I(nT)$. The second subtracter 38 subtracts the output signal $R_4(nT)$ of the fourth delay circuit 35 from the output signal $R_2(nT)$ of the second delay circuit 33 and outputs an output signal $B_Q(nT)$.

$$\begin{array}{rl} B_I(nT) & = R_D(nT) - R_3(nT) \\ & = 2A(nT)\cos\{n\pi/2 + \theta_c + \theta_m(nT)\} \\ B_Q(nT) & = R_2(nT) - R_4(nT) \\ & = 2A(nT)\sin\{n\pi/2 + \theta_c + \theta_m(nT)\} \end{array} \quad (22)$$

As shown in Equation (22), the outputs of the complex BPF 30 are two, orthogonal signals from which the direct-current offset component $A_{DC}(nT)$ contained in the output of the A/D converter 10 is eliminated. Therefore, the outputs of the complex BPF 30 can be expressed in terms of complex numbers as follows:

$$\begin{array}{rl} S_{BP}(nT) & = B_I(nT) + jB_Q(nT) \\ & = 2A(nT)\exp[j\{n\pi/2 + \theta_c + \theta_m(nT)\}] \end{array} \quad (23)$$

Consequently, as in the first embodiment, the quasi-coherent detected output can be obtained by implementing the complex multiplication of the above-mentioned output of the complex BPF 30 by the complex phase-counterrotating signal C(nT) and eliminating the IF frequency component.

A coefficient 2 of the output of the complex BPF 30 can be eliminated by multiplying ½ at the subsequent step of operation or performing the operation similar to that.

As apparent from Equations (22) and (23), the signal component of the output of the complex BPF 30 is doubled, and its electric power is quadrupled. However, the electric power of the quantization noises contained in the output of the A/D converter 10 is only doubled, since quantization noises are distributed uniformly. Thus, it can be seen that the effect of the quantization noises can be reduced equivalently.

As described hereinbefore, in this embodiment, two orthogonal signals are generated through the complex BPF. Consequently, the direct-current offset contained in the output of the A/D converter 10 can be eliminated, and the effect of the quantization noises can also be reduced.

Next, the transfer function of the complex BPF will be verified.

The output side of the complex BPF 30 for outputting $B_I(nT)$ subtracts a signal which is two-clock time delayed from an input signal. On the other hand, the output side of the complex BPF 30 for outputting $B_Q(nT)$ subtracts a signal which is further two-clock time delayed from a signal being one-clock time delayed from an input signal. Thus, the transfer function $H_I(z)$ of the output side of the complex BPF 30 for outputting $B_I(nT)$ and the transfer function $H_Q(z)$ of the output side for outputting $B_Q(nT)$ are represented respectively by the following equations of Equation (24):

$$\left.\begin{array}{l} H_I(z) = 1 - z^{-2} \\ H_Q(z) = z^{-1} - z^{-3} \end{array}\right\} \quad (24)$$

Consequently, $H_I[\exp(j\omega T)]$ and $H_Q[\exp(j\omega T)]$ representing the frequency characteristics of $H_I(z)$ and $H_Q(z)$ respectively are given by Equation (25) as follows:

$$\left.\begin{array}{rl} H_I(e^{j\omega T}) & = 1 - e^{-j2\omega T} \\ & = e^{-j\omega T}(2j\sin\omega T) \\ & = 2e^{-j(\omega T - \pi/2)}\sin\omega T \\ H_Q(e^{j\omega T}) & = e^{-j\omega T}(1 - e^{-j2\omega T}) \\ & = e^{-j2\omega T}(2j\sin\omega T) \\ & = 2e^{-j(2\omega T - \pi/2)}\sin\omega T \end{array}\right\} \quad (25)$$

Figure 4:
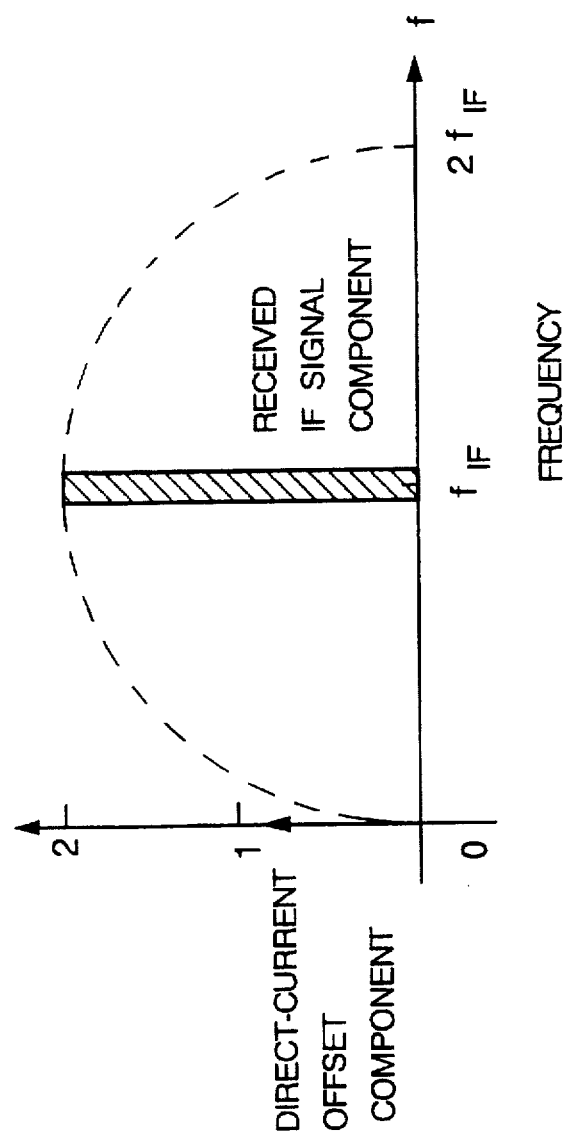
FIG. 4 is a graph illustrating the frequency characteristic of the complex BPF.

Thus, as is seen from $\sin\omega T$ representing the amplitude term of $H_I[\exp(j\omega T)]$ and $H_Q[\exp(j\omega T)]$, the frequency characteristics of $H_I(z)$ and $H_Q(z)$ indicate the characteristics of the complex BPF by which the direct current offset component can be eliminated. FIG. 4 shows the frequency characteristic of the complex BPF.

Embodiment 3

In this embodiment, a complex BPF in accordance with another embodiment of the present invention is described.

The quadrature detector of a demodulator according to the third embodiment of the present invention will be described, with reference to FIG. 5.

Figure 5A:
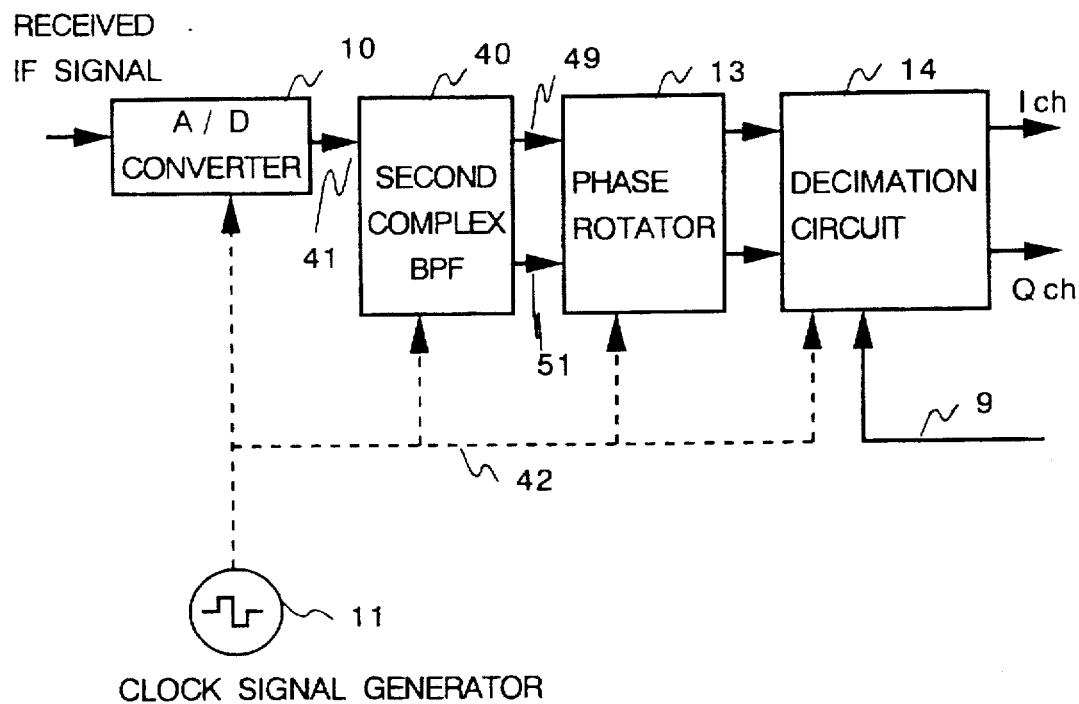
FIG. 5(a) is a block diagram showing a configuration of a demodulator according to the third embodiment of the present invention.
Figure 5B:
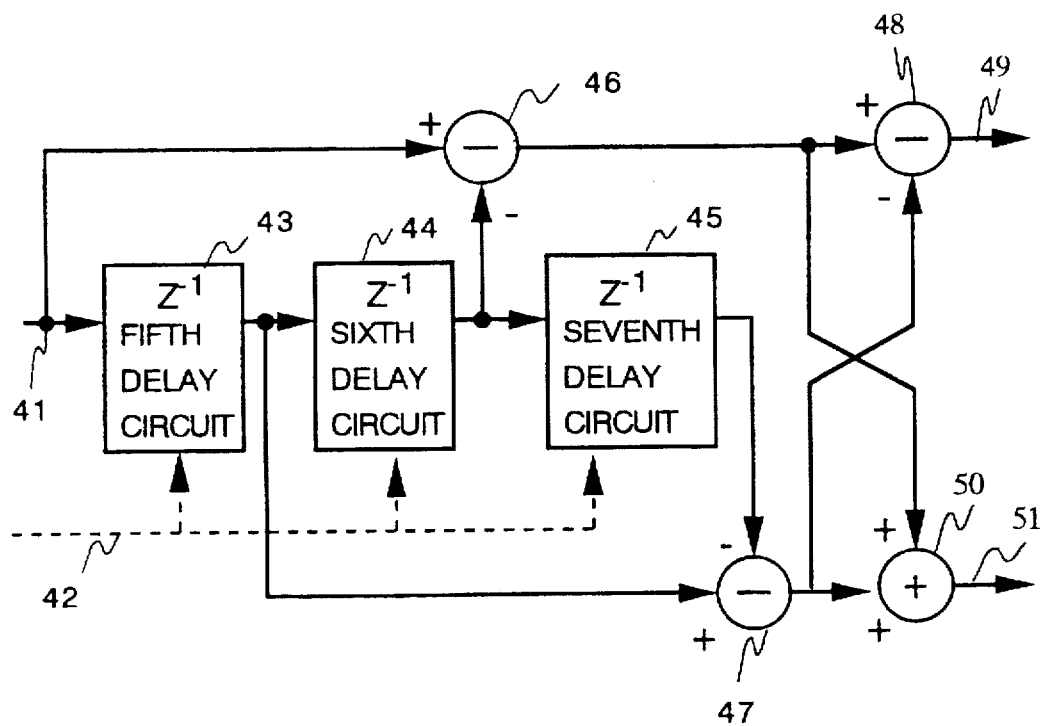
FIG. 5(b) is a block diagram showing a configuration of the second complex BPF illustrated in FIG. 5(a)

In FIG. 5(a), reference numeral 40 denotes a second complex BPF. FIG. 5(b) shows a configuration of the second complex BPF 40.

In FIG. 5(b), the second complex BPF 40 is comprised of an input terminal 41 for the output signal of the A/D converter 10, an input terminal 42 for a clock signal which has been output from the clock signal generator 11, a fifth delay circuit 43, a sixth delay circuit 44, seventh delay circuit 45 which are respectively clocked by a clock signal input into the input terminal 42 to delay the input signal of the input terminal 41 by one clock time each, a third subtracter 46 for subtracting the output signal of the sixth delay circuit 44 from the signal input into the input terminal 41, a fourth subtracter 47 for subtracting the output signal of the seventh delay circuit 45 from the output signal of the fifth delay circuit 43, a fifth subtracter 48 for subtracting the output signal of the fourth subtracter 47 from the output of the third subtracter 46. The second complex BPF is further comprised of an output terminal 49 for outputting the output of the fifth subtracter 48 to the phase-rotator 13, an adder 50 for adding the output of the third subtracter 46 and the output signal of the fourth subtracter 47, an output terminal 51 for outputting the output of the adder 50 to the phase-rotator 13.

Next, the operation of this embodiment will be described.

When the output signal of the A/D converter 10 is represented by Equation (18), output signals $R_5(nT)$ of the fifth delay circuit 43, $R_6(nT)$ of the sixth delay circuit 44, $R_7(nT)$ of the seventh delay circuit 45 become equivalent to $R_2(nT)$, $R_3(nT)$, $R_4(nT)$ given by Equation (21) respectively. Thus, output signals $B_{1I}(nT)$ of the third subtracter 46 and $B_{1Q}(nT)$ of the fourth subtracter 47 are equivalent to $B_I(nT)$ and $B_Q(nT)$ given by the equations of Equation (22) respectively.

Consequently, an output signal $B_{2I}(nT)$ of the fifth subtracter 48 and an output signal $B_{2Q}(nT)$ of the adder 50 are represented by the following equations of Equation (26) respectively:

$$\begin{aligned} B_{2I}(nT) &= B_I(nT) - B_Q(nT) \\ &= 2\sqrt{2}\ A(nT)\cos\{n\pi/2 + \theta_c + \theta_m(nT) + \pi/4\} \\ B_{2Q}(nT) &= B_I(nT) + B_Q(nT) \\ &= 2\sqrt{2}\ A(nT)\sin\{n\pi/2 + \theta_c + \theta_m(nT) + \pi/4\} \end{aligned} \quad (26)$$

The above-mentioned output signals $B_{2I}(nT)$ and $B_{2Q}(nT)$ are then output from the output terminals 49 and 51, respectively to the phase rotator 13.

As shown in Equation (26), the outputs of the second complex BPF 40 are two, orthogonal signals from which the direct-current offset component is eliminated. Thus, they can be expressed in terms of complex numbers, and as in the first embodiment, the quasi-coherent detected output can be obtained, using the complex phase-counterrotating signal $C(nT)$.

Embodiment 4

In addition to solving the problems presented in the first embodiment, this embodiment aims to reduce the effect of the quantization noises which will occur at the time of A/D conversion.

FIG. 6 and FIG. 7 are block diagrams showing a configuration of the quadrature detector of a demodulator according to this embodiment of the present invention.

Referring to FIG. 6, a clock signal generator 60 generates a clock signal having approximately eight times the frequency of a received IF signal. An A/D converter 61, being clocked by a clock signal which has been output from the clock signal generator 60, converts the received IF signal into a digital signal. A two-to-one frequency divider 62 divides the output frequency of the clock signal generator 60 by two, an IF signal amplifier 63 is actuated by the clock signal of the clock signal generator 60 and by the clock signal of the two-to-one frequency divider 62 and amplifies the output of the A/D converter 61.

FIG. 7 shows a configuration of the IF signal amplifier 63. Referring to FIG. 7, an input terminal 65 receives the output of the A/D converter 61. An input terminal 66 receives the clock signal of the clock signal generator 60. An input terminal 67 receives the output signal of the two-to-one frequency divider 62. A delay circuit 68 delays the input signal of the input terminal 65 by one clock time. An adder 69 adds the input signal of the input terminal 65 and the output signal of the delay circuit 68. A flip-flop 70 is clocked by the input signal of the input terminal 67 and latches the output signal of the adder 69. An output terminal 71 outputs the output of the flip-flop 70 to the phase rotator 13.

Next, the operation of this embodiment will be described.

Now, let us assume that the output signal of the A/D converter 61 is given by Equation (27).

$$R_B(nT_s) = A(nT_s)\cos\{\omega_c nT_s + \theta_c + \theta_m(nT_s)\} \quad (27)$$

In the above equation, $T_s$ is the period of the clock signal of the clock signal generator 60, and $T_s = 1/(8f_{IF})$. The output signal of the A/D converter 61 is input into the IF signal amplifier 63. The output signal of the A/D converter 61 is input into the delay circuit 68 of the IF signal amplifier 63 and delayed by one clock time, and in the adder 69, added to the signal which has been output from the A/D converter 61 and input into the adder 69 without passing through the delay circuit 68.

$$\begin{aligned} R_{ADD}(nT_s) &= A(nT_s)\cos\{\omega_c nT_s + \theta_c + \theta_m(nT_s)\} + \\ &\quad A((n-1)T_s)\cos\{\omega_c(n-1)T_s + \theta_c + \theta_m((n-1)T_s)\} \\ &\approx A(nT_s)\cos\{n\pi/4 + \theta_c + \theta_m(nT_s)\} + \\ &\quad A(nT_s)\cos\{n\pi/4 + \theta_c + \theta_m(nT_s) - \pi/4\} \\ &\approx 1.85 \times A(nT_s)\cos\{n\pi/4 + \theta_c + \theta_m(nT_s) - \pi/8\} \end{aligned} \quad (28)$$

In this embodiment, it is assumed that the same approximate equations of Equation (20) as described hereinbefore are also applicable. The sampling frequency of the output signal of the adder 69 is reduced from eight times to four times the frequency of the received IF signal through the flip-flop 70 and output from the output terminal 71. Then, as in the first embodiment, quasi-coherent detection is accomplished.

As apparent from Equation (28), the amplitude of the output signal of the adder 69 has become about 1.85 times that of the output of the A/D converter 61, and its power has become about 3.42 times. Thus, the effect of the quantization noises which occur at the time of A/D conversion and whose power becomes two times at the time of A/D conversion can be reduced.

In the present invention, the sampling frequency does not always have to be eight times the frequency of the received IF signal. It may be 2n (n is an integer greater than zero) times the frequency of the received IF signal, including 16 times, 32 times and the like. The effect of the quantization noises can be reduced likewise by the signal processing method similar to that described hereinbefore. In this case, a four-to-one frequency divider for dividing the frequency of the received IF signal by four should be used instead of the two-to-one frequency divider 62. The configuration of the IF signal amplifier 63 does not have to be restricted to the configuration having two taps for implementing the method of taking moving averages as described in this embodiment. Other configurations such as the one having four taps for implementing the method of taking moving averages can also be used.

Embodiment 5

This embodiment shows a configuration combining features of the second embodiment and the fourth embodiment. When compared with the fourth embodiment, this embodiment aims to further reduce the effect of the quantization noises at the time of A/D conversion and also eliminate the direct-current offset component.

FIG. 8 shows a configuration of the quadrature detector of a demodulator according to the fifth embodiment of the present invention.

Next, the operation of this embodiment is described.

It is assumed herein that the output signal of the A/D converter 61 is given by Equation (29).

$$R_{EE}(nT_s) = A(nT_s) \cos \{\omega_c nT_s + \theta_c + \theta_m(nT_s)\} + A_{DC}(nT_s) \quad (29)$$

The output signal of the A/D converter 61 is input into the IF signal amplifier 63, and is subject to the same signal processing as in the fourth embodiment. Then, the input signal of the flip-flop 70 is calculated by Equation (30) as follows:

$$\begin{aligned} R_{FF}(nT_s) &= A(nT_s)\cos\{\omega_c nT_s + \theta_c + \theta_m(nT_s)\} + A_{DC}(nT_s) + \\ &\quad A((n-1)T_s)\cos\{\omega_c(n-1)T_s + \theta_c + \\ &\quad \theta_m((n-1)T_s)\} + A_{DC}((n-1)T_s) \\ &= A(nT_s)\cos\{n\pi/4 + \theta_c + \theta_m(nT_s)\} + A_{DC}(nT_s) + \\ &\quad A(nT_s)\cos\{n\pi/4 + \theta_c + \theta_m(nT_s) - \pi/4\} + \\ &\quad A_{DC}(nT_s) \\ &= 1.85 \times A(nT_s)\cos\{n\pi/4 + \theta_c + \theta_m(nT_s) - \pi/8\} + \\ &\quad 2A_{DC}(nT_s) \end{aligned} \quad (30)$$

In the above equation, the approximate equations of Equation (20) are used, as in the fourth embodiment. Then, through the flip-flop 70 the sampling frequency is reduced from eight times to four times the frequency of the received IF signal.

$$R_{FFO}(2mT_s) = 1.85 \times A(2mT_s) \cos \{2m\pi/4 + \theta_c + \theta_m(2mT_s) - \pi/8\} + 2A_{DC}(2mT_s) \quad (31)$$

When $2T_s = T$, Equation (31) becomes equal to Equation (32). Excepting that the amplitude of the signal has become 1.85 times that of the output signal of the A/D converter 61, the phase of the signal is $\pi/8$ behind, and that the direct-current offset component has become doubled, Equation (32) is the same as Equation (18).

$$R_{FFO}(nT) = 1.85 \times A(nT) \cos \{n\pi/2 + \theta_c + \theta_m(nT) - \pi/8\} + 2A_{DC}(nT) \quad (32)$$

Consequently, as in the second embodiment, the following two outputs can be obtained by performing signal processing through the complex BPF 30:

$$\left. \begin{aligned} B_{II}(nT) &= (2 \times 1.85) \times A(nT)\cos\{n\pi/2 + \theta_c + \theta_m(nT) - \pi/8\} \\ B_{QQ}(nT) &= (2 \times 1.85) \times A(nT)\sin\{n\pi/2 + \theta_c + \theta_m(nT) - \pi/8\} \end{aligned} \right\} \quad (33)$$

Thus, as in the second embodiment, quasi-coherent detection becomes possible by using these outputs. As apparent from Equation (33), the amplitude of the signal component has become 2×1.85 times that of the output signal of the A/D converter 61. Consequently, the effect of the quantization noises has been reduced, and the direct-current offset component has been eliminated.

As described hereinbefore, in this embodiment, the effect of the quantization noises at the time of A/D conversion can be reduced by adding and subtracting the received IF signal sampled at eight times the frequency of the carrier frequency via the IF signal amplifier 63 and the complex BPF 30. The direct-current offset component can be also eliminated. As in the fourth embodiment, the sampling frequency of the signal does not always have to be eight times. It may be 2n (n is an integer greater than zero) times the frequency of the received IF signal.

Embodiment 6

An embodiment for improving the signal-to-noise ratio without performing high-speed signal processing is described.

In the fourth and fifth embodiments, when the oversampling rate of the received IF signal is high such as eight times or sixteen times the normal sampling rate, the sampling frequency must be high, too. Thus, high-speed signal processing of the circuitry is required. This embodiment aims to suppress the sampling frequency by making best use of the aliasing frequency at the time of the sampling operation, so as to increase the oversampling rate equivalently without performing high-speed signal processing.

Figure 9:
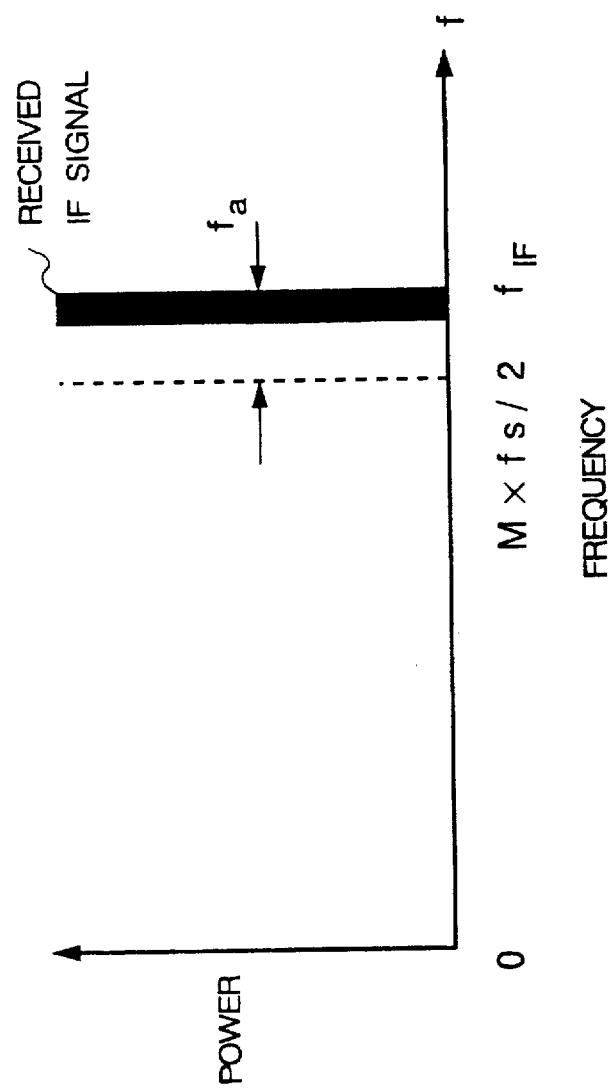
FIG. 9 is a graph illustrating the operation of a demodulator according to the sixth embodiment of the present invention.

The configuration of the quadrature detector of a demodulator according to this embodiment is the same as shown in FIG. 6 or FIG. 8. The sampling frequency, however, is set to satisfy the following Equation (35). FIG. 9 is a diagram showing this relationship.

Now, let us assume that the received IF frequency $f_{IF}$ is represented by the sampling frequency $f_S$ as follows by Equation (34):

$$f_{IF} = M \times f_s/2 + f_a \quad (34)$$

In the above equation, M is an integer greater than zero. Then, the frequency of the output of the A/D converter 61 is subject to aliasing in accordance with the sampling theorem, and becomes equal to $f_a$. When it is set that $f_s = N \times f_a$ (N is a positive integer, equal to or greater than 2), the output of the A/D converter 61 becomes equivalent to the received IF signal whose frequency has been converted to $f_a$, a difference between $M \cdot f_s/2$ and $f_{IF}$, sampled at the oversampling rate of N.

When the above equation is substituted into Equation (34), the following Equation (35) is obtained:

$$f_{IF} = M \times f_s/2 + f_s/N$$

$$2N f_{IF} = (MN+2) f_s \quad (35)$$

Consequently, the frequency of the output of the A/D converter 61 sampled at $f_a$ becomes equal to $f_s/N$ due to aliasing. Then, the output after A/D conversion becomes equivalent to the output for embodiments of the present invention using sampling at high frequencies. The effect of the quantization noises thus can be reduced by implementing the processing operation similar to that described in the fourth embodiment or the fifth embodiment.

As described above, in the quadrature detector of the demodulator according to this embodiment, even if the sampling frequency is not substantially high, an oversampling rate can be set to be large equivalently. Consequently, the effect of the quantization noises can be reduced in a low-speed signal processing operation.

Embodiment 7

This embodiment provides a demodulator whereby, regardless of the symbol rate, signal distortion, which will occur at the time of signal processing, and the direct-current offset component are eliminated. Referring to the second embodiment, for example, a received signal is input into the complex BPF 30 so as to eliminate the direct-current offset component. Consequently, the signal is distorted concurrently, as shown in FIG. 4. This embodiment aims to eliminate this distortion.

Figure 10:
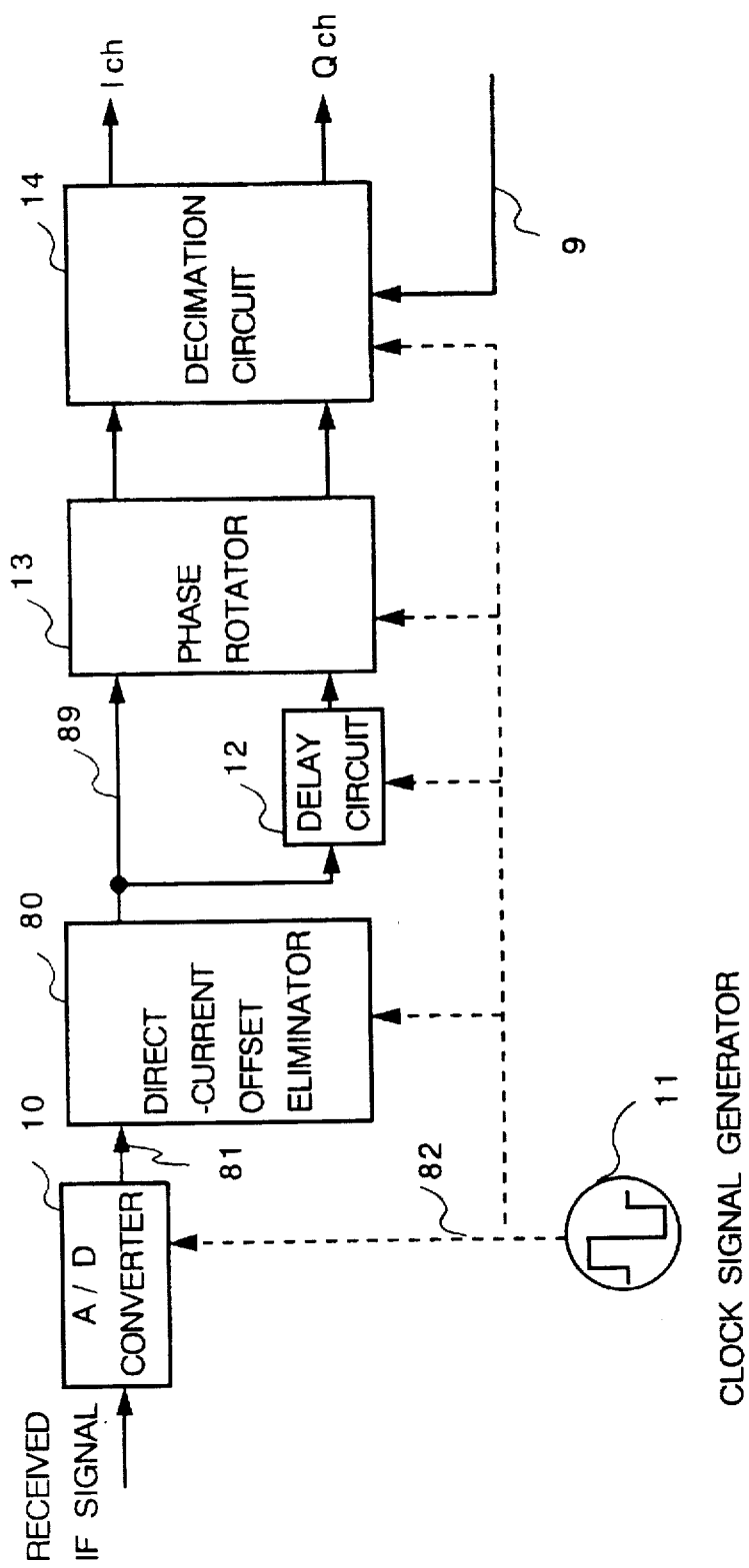
FIG. 10 is a block diagram showing a configuration of a demodulator according to the seventh embodiment of the present invention.
Figure 11:
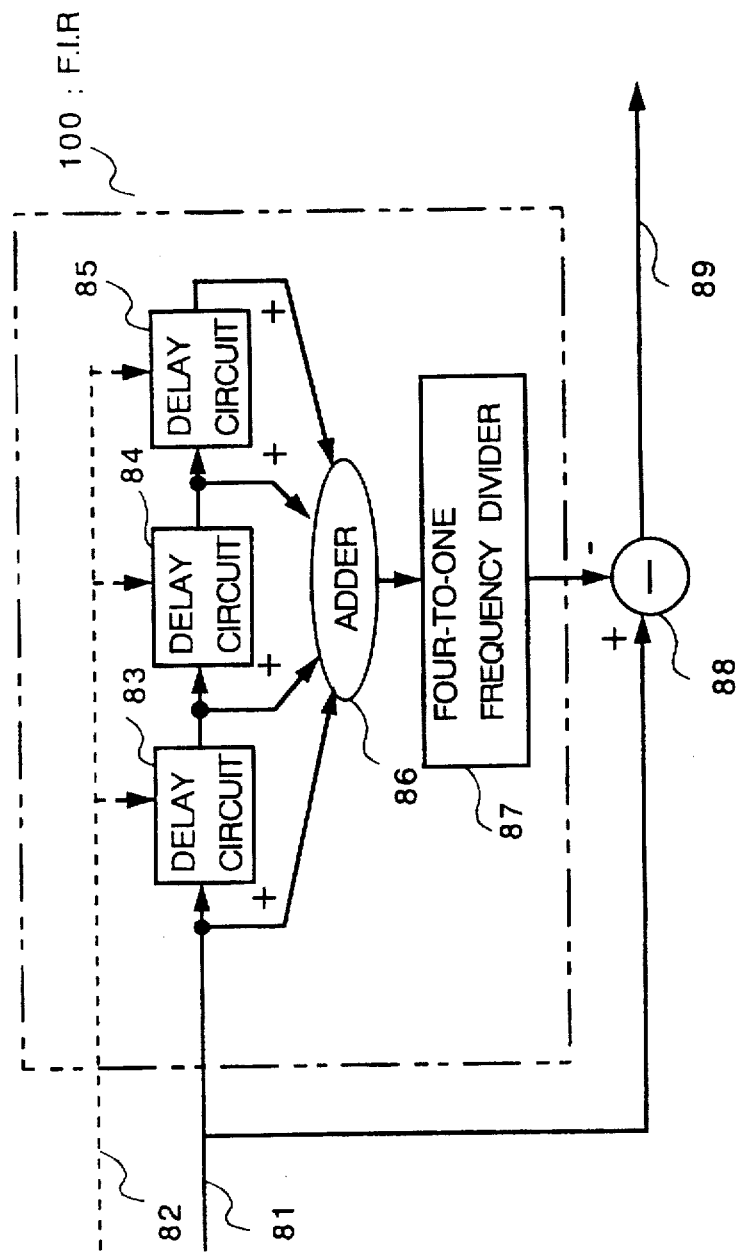
FIG. 11 is a block diagram showing a configuration of the direct-current eliminator illustrated in FIG. 10.

FIGS. 10 and 11 are block diagrams illustrating a configuration of the quadrature detector of a demodulator according to the seventh embodiment of the present invention.

Referring to FIG. 10, a direct-current offset eliminator 80 eliminates the direct-current offset component contained in the output signal of the A/D converter 10.

FIG. 11 illustrates a configuration of the direct-current offset eliminator 80.

In FIG. 11, the direct-current offset eliminator 80 is comprised of a four-tapped moving average circuit 100 of the FIR (Finite Impulse Response) type, a subtracter 88 for subtracting the output signal of the four-tapped moving average circuit 100 from the input signal of an input terminal 81, an output terminal 89 for outputting the output of the subtracter 88 to the phase-rotator 13. The four-tapped moving average circuit 100 is comprised of the input terminal 81 for receiving the output signal of the A/D converter 10, an input terminal 82 for receiving the clock signal of the clock signal generator 11, delay circuits 83, 84, and 85 clocked by the clock signal input into the input terminal 82 for respectively delaying the input signal of the input terminal 81 by one clock time each, an adder 86 for adding the input signal of the input terminal 81 and the output signals of the delay circuits 83, 84, and 85, a four-to-one divider 87 for dividing the output of the adder 86 by four.

Next, the operation of this embodiment will be described.

Now, let us assume that the output signal of the A/D converter 10 is represented by Equation (18).

The output signal of the A/D converter 10 is input into the direct-current offset eliminator 80 and divided into two branched outputs. One of the two branched outputs is input into the moving average circuit 100, where the moving average of the output is taken. When assuming an approximation similar to that described in the first embodiment, the signal component is eliminated through the moving average circuit 100. Consequently, an output $R_{MV}(nT)$ of the subtracter 88 is given by Equation (36).

$$\begin{aligned}R_{MV}(nT) &= (1/4)\,[A(nT)\cos\{\omega_c nT + \theta_c + \theta_m(nT)\} + \\ &\quad A_{DC}(nT) + A((n-1)T)\cos\{\omega_c(n-1)T + \\ &\quad \theta_c + \theta_m((n-1)T)\} + A_{DC}((n-1)T) + \\ &\quad A((n-2)T)\cos\{\omega_c(n-2)T + \theta_c + \\ &\quad \theta_m((n-2)T)\} + A_{DC}((n-2)T) + \\ &\quad A((n-3)T)\cos\{\omega_c(n-3)T + \theta_c + \\ &\quad \theta_m((n-3)T)\} + A_{DC}((n-3)T)] \\ &\approx (1/4)\,[A(nT)\cos\{\omega_c nT + \theta_c + \theta_m(nT)\} + \\ &\quad A_{DC}(nT) + A(nT)\sin\{\omega_c nT + \\ &\quad \theta_c + \theta_m(nT)\} + A_{DC}(nT) - \\ &\quad A(nT)\cos\{\omega_c nT + \theta_c + \theta_m(nT)\} + \\ &\quad A_{DC}(nT) - A(nT)\sin\{\omega_c nT + \\ &\quad \theta_c + \theta_m(nT)\} + A_{DC}(nT)] \\ &= A_{DC}(nT)\end{aligned} \quad (36)$$

Then, by subtracting the output $R_{MV}(nT)$ of the subtracter 88 given by Equation (36) from the output signal of the A/D converter 10 given by Equation (18), the direct-current offset component can be eliminated. The output of the subtracter 88 is then output to the phase rotator 13.

As described above, in this embodiment, the output of the A/D converter 10 is averaged. Consequently, the direct-current offset component can be eliminated without processing the signal component. The signal component thus can remain unchanged, without being distorted, even if the frequency of the received IF signal and the symbol rate are not fully different in value.

The configuration of the direct-current offset eliminator 80 does not always have to be the four-tapped moving average circuit. Other configurations using other types of FIR circuits, or an IIR (Infinite Impulse Response) circuit may also be used.

Embodiment 8

This embodiment provides a demodulator whereby the signal distortion which has occurred in the structural elements is eliminated at the subsequent step of operation so as to enhance accuracy of signal processing. In this embodiment, when the signal component distortion has occurred in the complex BPF 30 of the quadrature detector described in the second embodiment, for example, baseband processing is implemented at the subsequent step of operation so as to compensate for the distortion.

Figure 12:
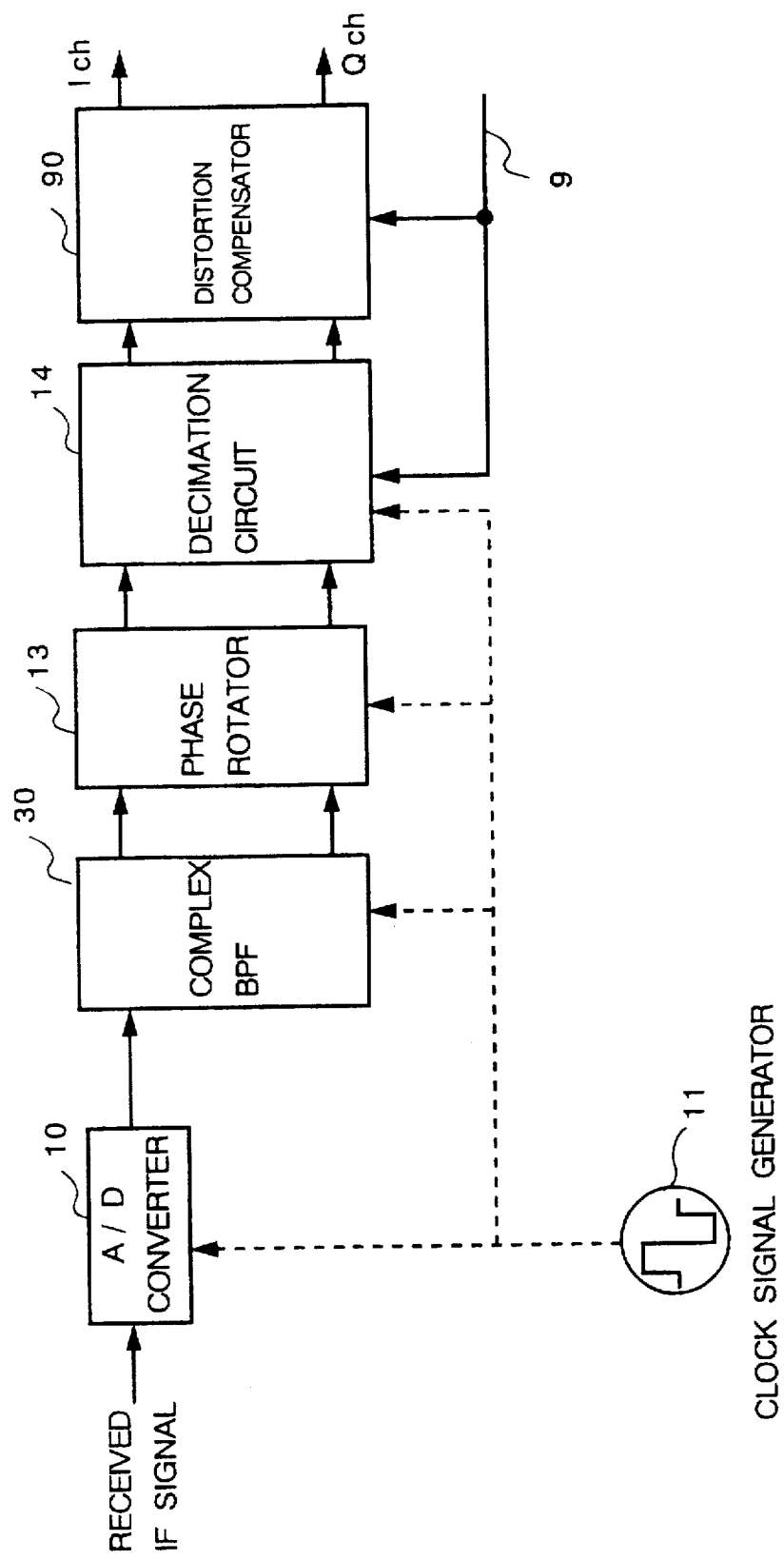
FIG. 12 is a block diagram showing a configuration of a demodulator according to the eighth embodiment of the present invention.

FIG. 12 is a block diagram showing a configuration of a demodulator according to the eighth embodiment of the present invention.

Referring to FIG. 12, a distortion compensator 90 compensates for the signal distortion which has occurred in the complex BPF 30, at baseband.

Next, the operation of this embodiment is described.

Now, it is assumed that the signal component has been distorted through the complex BPF 30, since the frequency of a received IF signal and the symbol rate are not fully different in value. In this case, the signal distortion is identified by examining the transfer function within the bandwidth represented by Equation (25). The signal which has been distorted through the complex BPF 30 is still distorted after it has become a baseband signal or after it has been output from the decimation circuit 14. Accordingly, when the transfer function of the complex BPF 30 representing its frequency characteristic is set to H [exp (JωT)], the distorted signal component can be eliminated by multiplying by the inverse transfer function $H^{-1}$ [exp (jωT)] in the distortion compensator 90. Consequently, signal transmission free from distortion becomes possible.

As described above, in this embodiment, the signal distortion which has occurred in the complex BPF is compensated for at baseband. Thus, signal transmission free from distortion becomes possible even if the frequency of the received IF signal and the symbol rate are not fully different in value.

In order to eliminate the signal distortion, the transfer function representing the characteristic of the baseband receiving filter and the signal distortion may also be used and multiplied by its reciprocal, instead of providing a distortion compensator specifically designed for that purpose within a demodulator.

In this embodiment, a description is directed to the method for compensating for the signal distortion which has occurred in the complex BPF 30 having the transfer function representing its frequency characteristic $H_1$ [exp (Jωt)] by means of the distortion compensator having the inverse transfer function of $H^{-1}$ [exp (Jωt)] at the subsequent step of operation. This method is also applicable to compensation for signal distortion which has occurred in the phase rotator 13. In this case, the transfer functions of the phase rotator 13 and the distortion compensator may be set to $H_2$ [exp (jωT)], $H_2^{-1}$ [exp (JωT)], respectively.

Embodiment 9

In this embodiment, a description is directed to a case where an A/D conversion technique by means of oversampling signals, including delta-modulation and delta-sigma-modulation, being excellent in reducing the quantization noises, is applied to the quadrature detector portion of a demodulator. In this case, the sampling technique making use of aliasing as described in the sixth embodiment is applied.

Figure 13:
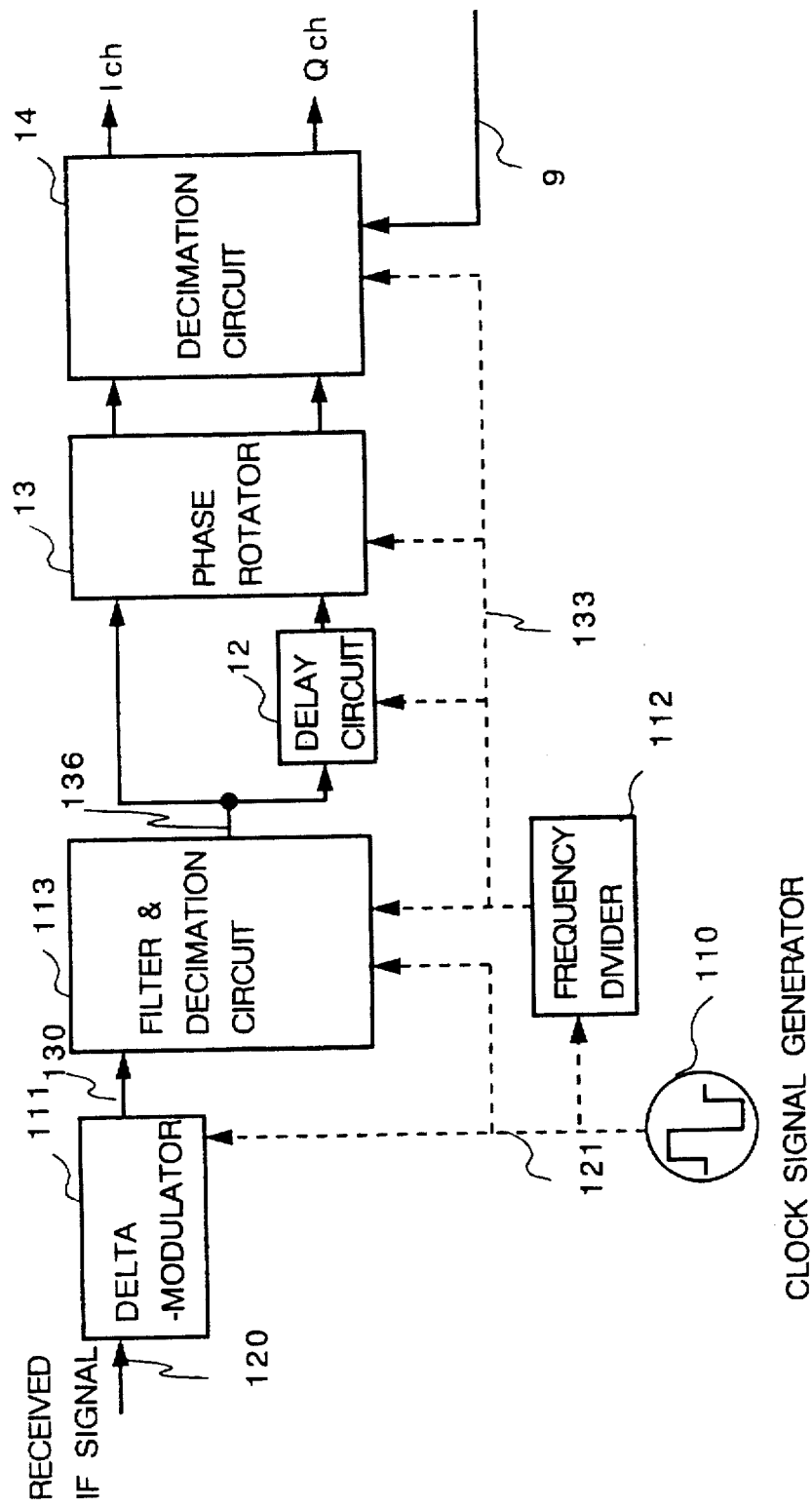
FIG. 13 is a block diagram showing a configuration of a demodulator according to the ninth embodiment of the present invention.
Figure 14:
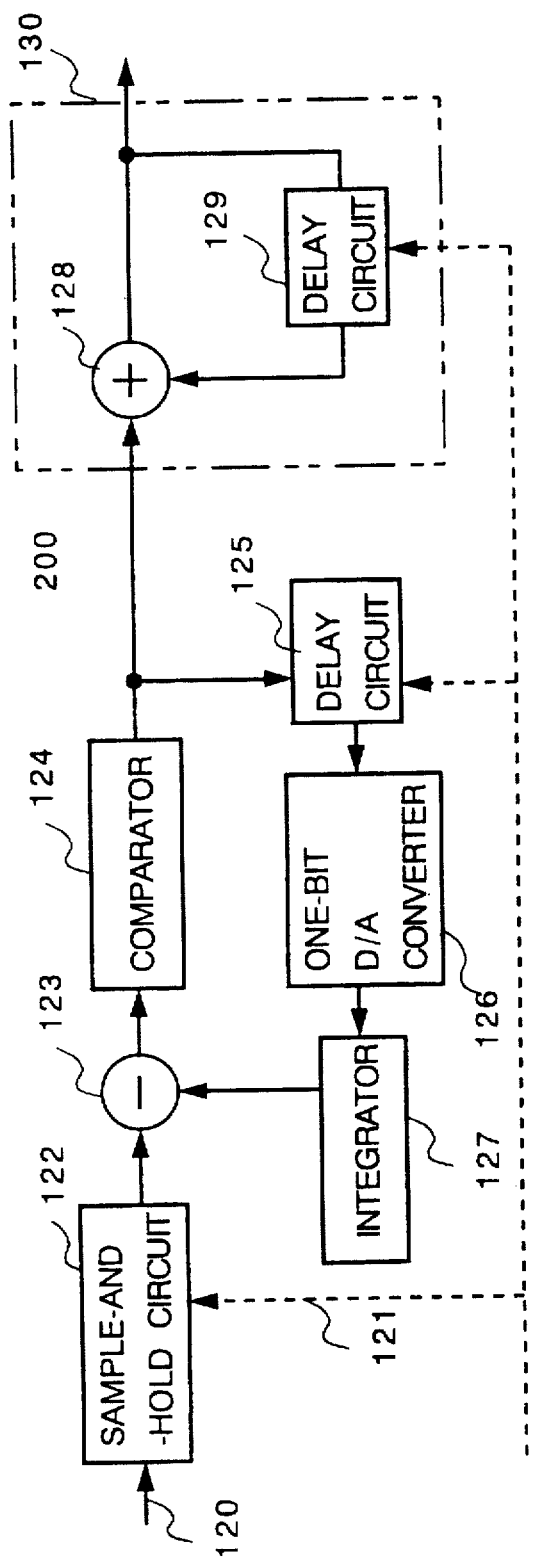
FIG. 14 is a block diagram showing a configuration of the delta-modulator illustrated in FIG. 13.
Figure 16:
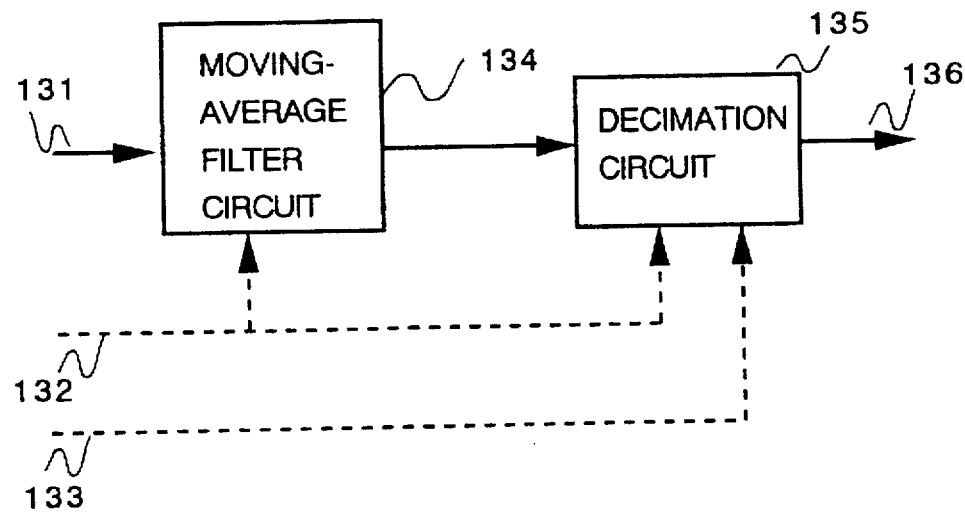
FIG. 16 is a block diagram showing a configuration of the filter and decimation circuit illustrated in FIG. 13.
Figure 17:
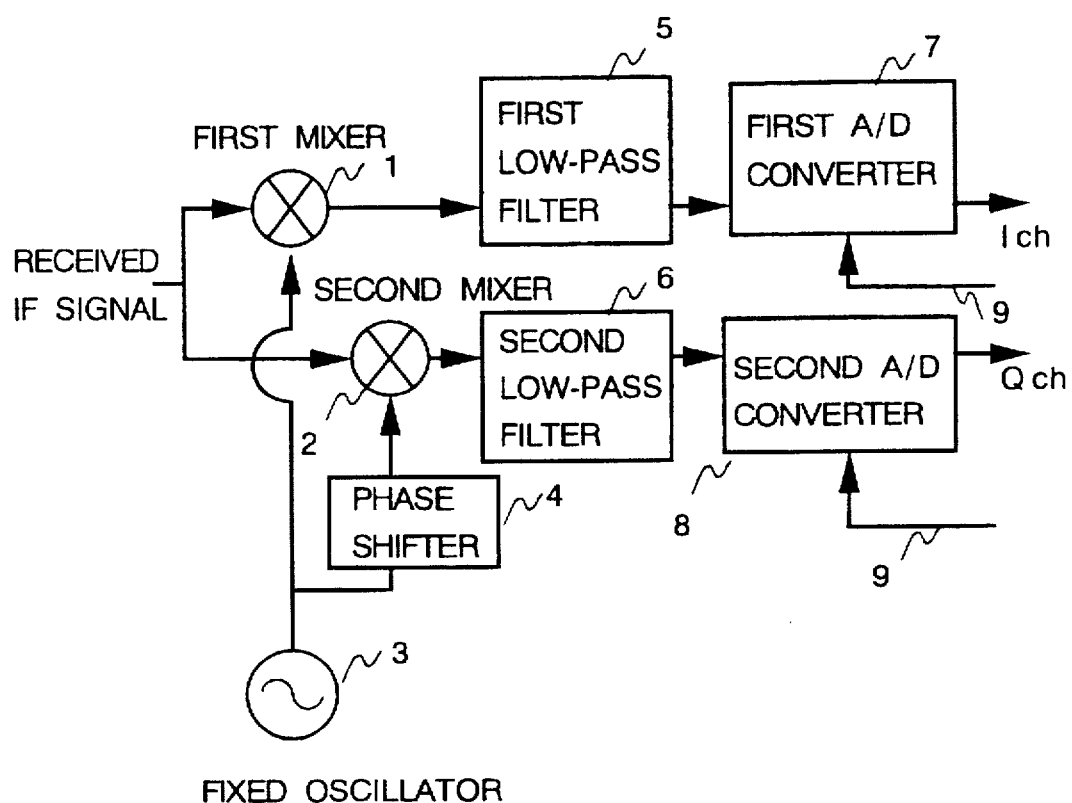
FIG. 17 is a block diagram showing a configuration of a conventional demodulator.

FIG. 13, FIG. 14, and FIG. 16 are block diagrams respectively showing a configuration of a demodulator according to the present invention.

In FIG. 13, a clock signal generator 110 generates a clock signal at a frequency satisfying Equation (35). A delta-modulator 111 is clocked by the clock signal of the clock signal generator 110. A frequency divider 112 divides the output frequency of the clock signal generator 110, and a filter and decimation circuit 113 averages the output of the delta-modulator 111 and outputs the decimated data output.

FIG. 14 is a block diagram showing a configuration of the delta-modulator 111. In FIG. 14, the delta-modulator is comprised of an input terminal 120 for a received IF signal, an input terminal 121 for the clock signal of the clock signal generator 110, a sample-and-hold circuit 122, clocked by the clock signal input into the input terminal 121 to sample the input signal of the input terminal 120, a subtracter 123 for subtracting the output of an integrator 127 from the output of the sample-and-hold circuit 122, a comparator 124 for detecting the polarity of the output of the subtracter 123 and for outputting $\lceil 1 \rfloor$ when the polarity is positive and outputting $\lceil -1 \rfloor$ when the polarity is negative, a delay circuit 125 for delaying the output of the comparator 124 by one clock time, a one-bit digital to analog (hereinafter referred to as D/A) converter 126 for performing D/A conversion of the output of the delay circuit 125, the integrator 127 for integrating the output of the one-bit D/A converter 126, an adder 128 for adding the output of the comparator 124 and the output of a delay circuit 129, the delay circuit 129 for delaying the output of the adder 128 by one clock time, an integrator 200 comprised of the adder 128 and the delay circuit 129, an output terminal 130 for outputting the output of the adder 128 to the filter and decimation circuit 113.

FIG. 16 is a block diagram showing a configuration of the filter and decimation circuit 113. In FIG. 16, the filter and decimation circuit 113 is comprised of an input terminal 131 for receiving the output of the delta-modulator 111, an input terminal 132 for receiving the output of the clock signal generator 110, an input terminal 133 for receiving the output of the frequency divider 112, a moving-average filter circuit 134 which is clocked by the clock signal of the input terminal 132 to take the moving average of the signal input into the input terminal 131. The moving-average filter circuit 134 may be, for example, in the form of the four-tapped moving-average circuit shown in FIG. 11. The filter and decimation circuit 113 is further comprised of a decimation circuit 135 which is clocked by a clock signal input into the input terminal 133 to decimate the output of the moving-average filter circuit 134, and an output terminal 136 for outputting the output of the decimation circuit 135.

Next, the operation of a demodulator according to this embodiment will be described.

It is assumed herein that the output frequency $f_s$ of the clock signal generator 110 and the received IF frequency $f_{IF}$ satisfy Equation (35).

Figure 15:
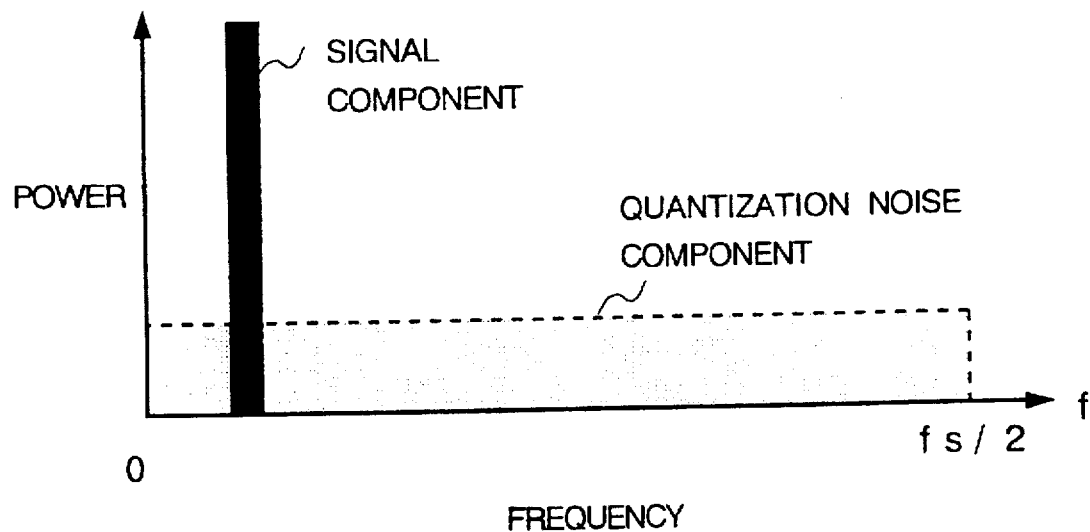
FIG. 15 is a graph illustrating the relationship between the signal component and the quantization noise component in the output of the delta-modulator illustrated in FIG. 13.

In this situation, as in the sixth embodiment, since the frequency $f_{S/H}$ of the output signal of the sample-and-hold circuit 122 becomes $F_{S/N}$ due to aliasing, the frequency $f_{S/H}$ becomes equal to the frequency of the received IF signal having a center frequency $f_{S/H}$ sampled at the oversampling rate of N. Consequently, by delta-modulating the output of the sample-and-hold circuit 122 and integrating the modulated output again via the integrator 200 within the delta-modulator, the A/D converted output using the high-accuracy delta-modulator is output from the output terminal 130. Furthermore, as is well known, quantization noises are distributed uniformly within the range of the frequencies up to the half of the sampling frequency. FIG. 15 shows the relationship between the quantization noise component and the sampling frequency in the output of the delta-modulator.

The output signal of the delta-modulator 111 output from the output terminal 130 is input into the input terminal 131 of the filter and decimation circuit 113. Then, through the moving-average filter circuit 134, by eliminating the frequency components which are higher than the signal frequency, elimination of the quantization noise component within the high frequency band is accomplished. Consequently, the SN ratio is improved.

The output signal of the moving-average filter circuit 134 having aliased oversampling rate, from which the quantization noise component is reduced, is decimated through the decimation circuit 135 by the clock signal which has been output from the frequency divider 112 and input into the input terminal 133. When the output frequency of the frequency divider 112 is set to $4 \times f_{S/H}$, it is the same as sampling the received IF signal having the center frequency $f_{S/H}$ at four times the sampling frequency. Consequently, at the subsequent step of operation, signal processing similar to that described hereinbefore becomes possible, and high-accuracy quasi-coherent quadrature detection of a digitalized signal becomes possible.

As described hereinbefore, according to the present invention, a received IF signal which has been downconverted by means of aliasing in the sampling operation is delta-modulated. Consequently, the delta-modulation technique, which is excellent in reducing the quantization noises can be applied in low-speed signal processing.

In the decimation process, as shown in this embodiment, a low-speed clock signal does not necessarily have to be generated by dividing the frequency of a high-speed clock signal. Alternatively, another asynchronous clock signal generator may be used. The A/D conversion technique by means of oversampling signals does not have to be restricted to the delta-modulation system, either. A multistage noise shaping (MASH) system may also be used.

As described hereinbefore, according to the present invention, a received signal is subject to A/D conversion in the radio frequency range or in the intermediate frequency range, and quadrature detection is accomplished by phase-rotating (multiplying) the complex signal by specific values of the carrier frequency. Consequently, high-accuracy quadrature detection and high-accuracy amplitude matching of quasi-coherent detected in-phase and quadrature-phase signals can be obtained.

Furthermore, the digital BPF is provided in the quadrature detector. Thus, in addition to the above-mentioned effect of obtaining high accuracy of quadrature detection and amplitude matching of quasi-coherent detected in-phase and quadrature-phase signals, the direct-current offset component can also be eliminated.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and equivalents thereto.

What is claimed is:

1. A demodulator for demodulating a received signal having a carrier frequency, and for generating an I channel signal and a Q channel signal, comprising:
   a clock signal generator for generating a clock signal having a frequency;
   an analog to digital converter having a sample rate controlled by the frequency of the clock signal for converting the received signal to a digital received signal;
   a complex signal generator that receives the clock signal, the digital received signal, and a $\pi/2$ phase-shifted signal generated by delaying the phase of the digital received signal by $\pi/2$, and generates a complex signal;
   a phase rotator for generating quasi-coherent detected signals by multiplying the complex signal by specific values of the carrier frequency; and
   a decimation circuit for generating the I channel signal and the Q channel signal by decimating the quasi-coherent detected signals.

2. The demodulator according to claim 1, wherein the frequency of the clock signal is four times the carrier frequency, and wherein the complex signal generator selects one of the digital received signal and the $\pi/2$ phase-shifted signal for an input of the phase rotator.

3. The demodulator according to claim 1, wherein the frequency of the clock signal is four times the carrier frequency, and wherein the complex signal generator is a complex band pass filter including plural cascaded delay circuits controlled by the clock signal for delaying the digital received signal, and wherein the complex band pass filter combines outputs of the delay circuits and the digital received signal.

4. The demodulator according to claim 3, wherein the complex band pass filter includes first, second, and third cascaded delay circuits, each providing an output signal, and wherein the complex band pass filter has first and second outputs and is adapted to provide at the first output a difference between the output signal from the second delay circuit and the digital received signal, and to provide at the second output a difference between the output signal from the third delay circuit and the output signal from the first delay circuit.

5. The demodulator according to claim 1, wherein the frequency of the clock signal is four times the carrier frequency, and wherein the phase rotator includes a modulo 4 counter, and multipliers which multiply outputs of the modulo 4 counter by outputs of the complex signal generator.

6. The demodulator according to claim 1, wherein the frequency of the clock signal is eight times the carrier frequency, and wherein the demodulator further comprises a signal amplifier including a delay element controlled by the clock signal, for delaying the digital received signal, an adder for adding an output of the delay element and the digital received signal, and a flip-flop controlled by a clock signal having a frequency that is half the frequency of the clock signal.

7. The demodulator according to claim 6, wherein the frequency of the clock signal is $f_s$, wherein the carrier frequency is $f_{IF}$, and wherein $2Nf_{IF}=(MN+2)f_s$, M and N being integers greater than zero.

8. The demodulator according to claim 1, further comprising a direct-current offset eliminator, including one of a Finite-Impulse-Response (FIR) filter and an Infinite-Impulse-Response (IIR) filter, and a subtracter which generates a difference between the digital received signal and one of an output of the FIR filter and an output of the IIR filter, for eliminating a DC offset component in the digital received signal.

9. The demodulator according to claim 8, wherein the direct-current offset eliminator includes three cascaded delay elements, an adder for adding outputs of the delay elements, and a frequency divider for averaging an output of the adder.

10. The demodulator according to claim 1, further comprising a distortion compensator having a transfer function substantially equivalent to an inverse of a transfer function of one of the complex signal generator and the phase rotator, for compensating distortion generated in the complex signal generator and the phase rotator.

11. The demodulator according to claim 1, wherein the analog to digital converter includes a delta-modulator and a filter-and-decimation circuit coupled to the delta-modulator.

12. The demodulator according to claim 1 in combination with:
   a transmitter for transmitting an information signal, the transmitter including a modulator; and
   a receiver for receiving the information signal, the receiver including the demodulator of claim 1.

13. A method for demodulating a received signal having a carrier frequency, using a demodulator having a clock signal generator for generating a clock signal having a frequency of 4 times n times the carrier frequency, n being an integer greater than zero, and an analog-to-digital converter having a sample rate controlled by the frequency of the clock signal for converting the received signal to a digital received signal, comprising steps of:
   delaying the received signal to generate a $\pi/2$ phase-shifter signal;
   generating a complex signal using the digital received signal and the $\pi/2$ phase-shifted signal; and
   generating quasi-coherent detected signals by multiplying the complex signal by specific values of the carrier frequency.

14. The demodulator according to claim 1, wherein the frequency of the clock signal is 4 times n times the frequency of the carrier frequency, wherein n is an integer greater than zero.

15. The demodulator according to claim 1, wherein the delta modulator includes a sample-and-hold circuit, a closed loop including a one bit digital to analog converter, and an adder, controlled by the clock signal.

* * * * *